United States Patent
Liu et al.

(10) Patent No.: US 10,574,965 B2
(45) Date of Patent: Feb. 25, 2020

(54) SIMPLIFIED ADVANCED RESIDUAL PREDICTION FOR 3D-HEVC

(71) Applicants: Hongbin Liu, Beijing (CN); Ying Chen, San Diego, CA (US); QUALCOMM Incorporated, San Diego, CA (US)

(72) Inventors: Hongbin Liu, Beijing (CN); Ying Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 673 days.

(21) Appl. No.: 15/120,067

(22) PCT Filed: Mar. 13, 2014

(86) PCT No.: PCT/CN2014/073353
§ 371 (c)(1),
(2) Date: Aug. 18, 2016

(87) PCT Pub. No.: WO2015/135172
PCT Pub. Date: Sep. 17, 2015

(65) Prior Publication Data
US 2017/0013275 A1    Jan. 12, 2017

(51) Int. Cl.
*H04N 19/597* (2014.01)
*H04N 19/176* (2014.01)
(Continued)

(52) U.S. Cl.
CPC .......... *H04N 13/15* (2018.05); *H04N 13/271* (2018.05); *H04N 19/176* (2014.11);
(Continued)

(58) Field of Classification Search
CPC ... H04N 13/243; H04N 13/271; H04N 13/282
See application file for complete search history.

(56) References Cited

U.S. PATENT DOCUMENTS

| 5,619,256 A * | 4/1997 | Haskell ............... H04N 19/597 348/43 |
| 9,288,501 B2 * | 3/2016 | Zheng ................. H04N 19/197 |

(Continued)

FOREIGN PATENT DOCUMENTS

| CN | 101917619 A | 12/2010 |
| WO | 2012015650 A2 | 2/2012 |
| WO | 2012121808 A1 | 9/2012 |

OTHER PUBLICATIONS

Y. Kim, S. Choi, S. Cho, & K. Sohn, "Efficient disparity vector coding for multiview sequences", 19 Image Communication 539-553 (2004) (Year: 2004).*

(Continued)

*Primary Examiner* — David N Werner
(74) *Attorney, Agent, or Firm* — Shumaker & Sieffert, P.A.

(57) ABSTRACT

This disclosure describes techniques for 3D video coding. In particular, this disclosure is related to techniques for advanced residual prediction (ARP) in 3D-HEVC. According to one techniques of this disclosure, when performing inter-view ARP for a bi-directionally predicted block, the video coder may determine a motion vector for a first corresponding block as part of performing ARP for a first prediction direction and reuse that determined motion vector when performing ARP for a second prediction direction. According to another technique, for a bi-directionally predicted block, a video coder may apply ARP in only one direction for a chroma component of a block but apply ARP in two directions for a luma component of the block. According to another technique, a video coder may selectively apply ARP to chroma components based on block (Continued)

size. These simplifications, as well as other techniques included in this disclosure, may reduce overall coding complexity.

24 Claims, 20 Drawing Sheets

(51) Int. Cl.

| | |
|---|---|
| H04N 19/513 | (2014.01) |
| H04N 19/186 | (2014.01) |
| H04N 19/577 | (2014.01) |
| H04N 13/15 | (2018.01) |
| H04N 13/271 | (2018.01) |
| H04N 19/105 | (2014.01) |
| H04N 13/161 | (2018.01) |
| H04N 13/282 | (2018.01) |
| H04N 13/243 | (2018.01) |

(52) U.S. Cl.
CPC ......... *H04N 19/186* (2014.11); *H04N 19/513* (2014.11); *H04N 19/577* (2014.11); *H04N 19/597* (2014.11); *H04N 13/161* (2018.05); *H04N 13/243* (2018.05); *H04N 13/282* (2018.05); *H04N 19/105* (2014.11)

(56) References Cited

U.S. PATENT DOCUMENTS

| | | | | |
|---|---|---|---|---|
| 9,398,308 | B2 | 7/2016 | Chien et al. | |
| 2007/0071107 | A1* | 3/2007 | Ha | H04N 19/597 375/240.24 |
| 2013/0242046 | A1 | 9/2013 | Zhang et al. | |
| 2013/0258052 | A1 | 10/2013 | Li et al. | |
| 2014/0161188 | A1* | 6/2014 | Zhang | H04N 19/597 375/240.16 |
| 2014/0184740 | A1* | 7/2014 | Zhang | H04N 19/597 348/43 |
| 2015/0201176 | A1* | 7/2015 | Graziosi | H04N 13/111 348/43 |
| 2015/0201212 | A1* | 7/2015 | Zhang | H04N 19/52 375/240.15 |
| 2016/0337635 | A1* | 11/2016 | Nisenzon | H04N 13/271 |
| 2019/0222821 | A1* | 7/2019 | Graziosi | H04N 13/111 |

OTHER PUBLICATIONS

D. Tzovaras, N. Grammalidis, & M.G. Strintzis, "Disparity field and depth map coding for multiview 3D image generation", 11 Image Communication 205-230 (1998) (Year: 1998).*
International Search Report and Written Opinion from International Application No. PCT/CN2014/073353, dated Jun. 26, 2016, 13 pp.
Zhang et al., "Test Model 6 of 3D-HEVC and MV-HEVC", 6th Meeting, Oct. 25 through Nov. 1, 2013, Geneva, CH; (Joint Collaborative Team on 3D Video Coding Extension Development of ITU-T SG 16 WP 3 and ISO/IEC JTC 1/SC 29/WG 11), JCT3V-F1005, Dec. 16, 2013, 57 pp.
Tech et al., "3D-HEVC Draft Text 2", 6th Meeting, Oct. 25 through Nov. 1, 2013, Geneva, CH; (Joint Collaborative Team on 3D Video Coding Extension Development of ITU-T SG 16 WP 3 and ISO/IEC JTC 1/SC 29/WG 11), JCT3V-F1001-v4, Jan. 13, 2014, 94 pp.
Zhang et al., "CE5.h: Disparity vector generation results", 1st Meeting, Jul. 16 through 20, 2012, Stockholm, SE;(Joint collaborative Team on 3D Video Coding Extension Development of ITU-T SG 16 WP 3 and ISO/IEC JTC 1/SC 29/WG 11), JCT3V-A0097, Jan. 13, 2014, 5 pp.
Sung et al., "3D-CE5.h: Simplification of disparity vector derivation for HEVC-based 3D video coding.", 1st Meeting, Jul. 16 through 20, 2012, Stockholm, SE; (Joint Collaborative Team on 3D Video Coding Extension Development of ITU-T SG 16 WP 3 and ISO/IEC JTC 1/SC 29/WG 11), JCT3V-A0126_V2, Jan. 13, 2014, 4 pp.
Kang et al., "3D-CE5.h related: Improvements for disparity vector derivation", 2nd Meeting, Oct. 13 through 19, 2012, Shanghai, CN; (Joint Collaborative Team on 3D Video Coding Extension Development of ITU-T SG 16 WP 3 and ISO/IEC JTC 1/SC 29/WG 11), JCT3V-B0047, Jan. 13, 2014, 4 pp.
Kang et al., "CE2.h related: CU-based Disparity Vector Derivation in 3D-HEVC", 4th Meeting, Apr. 20 through 26, 2013, Incheon, KR; (Joint Collaborative Team on 3D Video Coding Extension Development of ITU-T SG 16 WP 3 and ISO/IEC JTC 1/SC 29/WG 11), JCT3V-D0181, Jan. 13, 2014, 4 pp.
Zhang et al., "CE4: Advanced residual prediction for multiview coding", 4th Meeting, Apr. 20 through 26, 2013, Incheon, KR; (Joint Collaborative Team on 3D Video Coding Extension Development of ITU-T SG 16 WP 3 and ISO/IEC JTC 1/SC 29/WG 11), JCT3V-D0177, Apr. 13, 2013, 9 pp.
Zhang et al., "CE4: Further improvements on advanced residual prediction", 6th Meeting, Oct. 25 through Nov. 1, 2013, Geneva, CH; (Joint Collaborative Team on 3D Video Coding Extension Development of ITU-T SG 16 WP 3 and ISO/IEC JTC 1/SC 29/WG 11), JCT3V-F0123, Oct. 18, 2013, 6 pp.
Zhang et al., "3D-CE4: Advanced residual prediction for multi-view coding", 3rd Meeting, Jan. 17 through 23, 2013, Geneva, CH; (Joint Collaborative Team on 3D Video Coding Extension Development of ITU-T SG 16 WP 3 and ISO/IEC JTC 1/SC 29/WG 11), JCT3V-00049, Jan. 10, 2013, 6 pp.
An et al., "3D-CE3:Sub-PU level inter-view motion prediction", 6th Meeting, Oct. 25 through Nov. 1, 2013, Geneva, CH; (Joint Collaborative Team on 3D Video Coding Extension Development of ITU-T SG 16 WP 3 and ISO/IEC JTC 1/SC 29/WG 11), JCT3V-F0110, Oct. 19, 2013, 4 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Chen Y-W., et al., "3D-AHG5: On Complexity Reduction of Hi-Prediction for Advanced Residual Prediction," 7. JCT-3V Meeting; Jan. 11, 2014-Jan. 17, 2014; San Jose; (The Joint Collaborative Team on 3D Video Coding Extension Development of ISO/IEC JTC1/SC29/WG11 and ITU-T SG.16); No. JCT3V-G0057, Jan. 4, 2014 (Jan. 4, 2014), pp. 1-6, XP030131806.
Lee J.Y., et al, "3D-CE5.a Related Results on Temporal Motion Vector Prediction in Dependent View," Joint Collaborative Team on 3D Video Coding Extension Development of ITU-T SG 16 WP 3 and ISO/IEC JTC 1/SC 29/WG 11 2nd Meeting: Shanghai, CN, Oct. 13-19, 2012, pp. 1-5, JCT3V-B0153.
Li X., et al., "Advanced Residual Prediction in 3D-HEVC," 2013 IEEE International Conference on Image Processing, Sep. 15, 2013 (Sep. 15, 2013), pp. 1747-1751, XP032965972, [retrieved on Feb. 11, 2014].
Liu H., et al., "CE2 Related: Simplification of Advanced Residual Prediction," 8. JCT-3V Meeting; Mar. 29, 2014-Apr. 4, 2014; Valencia; (The Joint Collaborative Team on 3d Video Coding Extension Development of ISO/IEC JTC1/SC29/WG11 and ITU-T SG.16); URL: http://phenix.int-evry.fr/jct2/, No. JCT3V-H0132, Mar. 21, 2014, pp. 1-7, XP030132208.
Park M.W., et al., "3D-CE2.h Related: Simplified NBDV and Improved Disparity Vector Derivation," 5. JCT-3V Meeting; Jul. 27, 2013-Aug. 2, 2013; Vienna; (The Joint Collaborative Team on 3D Video Coding Extension Development of ISO/IEC JTC1/SC29/WG11 and ITU-T SG.16); URL: http://phenix.int-evry.fr/jct2/,, No. JCT3V-E0142, Jul. 19, 2013 (Jul. 19, 2013), XP030131163, pp. 1-5.
Supplementary European Search Report for EP14885463.1—Search Authority—Berlin—Oct. 26, 2017.
Zhang L., et al., "CE4: Further Improvements on Advanced Residual Prediction," 6. JCT-3V Meeting; Oct. 25, 2013-Nov. 1, 2013, Geneva; (The Joint Collaborative Team on 3D Video Coding Extension Development of ISO/IEC JTC1/SC29/WG11 and ITU-T SG.16 ), No. JCT3V-F0123, Oct. 18, 2013 (Oct. 18, 2013), 6 Pages, XP030131548.
Zhang L., et al., "Test Model 7 of 3D-HEVC and MV-HEVC," 7th Meeting, Jan. 11 through 17, 2014, San Jose, USA, Joint Collab-

(56) References Cited

OTHER PUBLICATIONS orative Team on 3D Video Coding Extension Development of ITU-T SG 16 WP 3 and ISO/IEC JTC1/SC 29/WG 11, JCT3V-G1005, Feb. 14, 2014, 56 pp.

* cited by examiner

SIMPLIFIED ADVANCED RESIDUAL PREDICTION FOR 3D-HEVC

This application is a national stage entry under 35 U.S.C. § 371 of International Application No. PCT/CN2014/073353, filed Mar. 13, 2014.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Extensions of some of the aforementioned standards, including H.264/AVC, may provide techniques for multiview video coding in order to produce stereo or three-dimensional ("3D") video. In particular, techniques for multiview coding have been proposed for use in AVC, with the scalable video coding (SVC) standard (which is the scalable extension to H.264/AVC), and the multi-view video coding (MVC) standard (which has become the multiview extension to H.264/AVC).

Typically, stereo video is achieved using two views, e.g., a left view and a right view. A picture of the left view can be displayed substantially simultaneously with a picture of the right view to achieve a three-dimensional video effect. For example, a user may wear polarized, passive glasses that filter the left view from the right view. Alternatively, the pictures of the two views may be shown in rapid succession, and the user may wear active glasses that rapidly shutter the left and right eyes at the same frequency, but with a 90 degree shift in phase.

SUMMARY

In general, this disclosure describes techniques for 3D video coding. In particular, this disclosure is related to techniques for advanced residual prediction (ARP) in 3D-HEVC.

In one example, a method of coding video data includes determining that a current block of a first view is coded using an advanced residual prediction (ARP) mode, wherein the current block is bi-directionally predicted; determining a first disparity motion vector and a second disparity motion vector for the current block; locating, with the first disparity motion vector, a first corresponding block for the current block in a second view; locating, with the second disparity motion vector, a second corresponding block of the current block in a second view; determining a motion vector from motion information of at least one of the first corresponding block of the current block and the second corresponding block of the current block; using the motion vector, identifying a reference block of the current block in the first view, a reference block of the first corresponding block in the second view, and a reference block of the second corresponding block in the second view; generating a first predictive block based on the first corresponding block, the reference block of the current block, and the reference block of the first corresponding block; and, generating a second predictive block based on the second corresponding block, the reference block of the current block, and the reference block of the second corresponding block.

In another example, a method of coding video data includes determining a current block of a first view is coded using an advanced residual prediction (ARP) mode, wherein the current block is bi-directionally predicted; for a luma block of the current block, performing ARP for a first prediction direction to determine a first predictive block of the luma block; for the luma block of the current block, performing ARP for a second prediction direction to determine a second predictive block of the luma block; and, for a chroma block of the current block, performing ARP for only one of the first prediction direction or the second prediction direction to determine a first predictive block of the chroma block.

In another example, a method of coding video data includes determining a current block of a first view is coded using an advanced residual prediction (ARP) mode; for a luma block of the current block, performing ARP to determine a predictive block of the luma block; for a chroma block of the current block, determining whether to perform ARP for the chroma block based on a size of the chroma block.

In another example, a computer-readable storage medium stores thereon instructions that when executed cause one or more processors to perform the methods or combination of methods above.

In another example, a device for coding video includes a video coder configured to determine that a current block of a first view is coded using an advanced residual prediction (ARP) mode, wherein the current block is bi-directionally predicted; determine a first disparity motion vector and a second disparity motion vector for the current block; locate, with the first disparity motion vector, a first corresponding block for the current block in a second view; locate, with the second disparity motion vector, a second corresponding block of the current block in a second view; determine a motion vector from motion information of at least one of the first corresponding block of the current block and the second corresponding block of the current block; using the motion vector, identify a reference block of the current block in the first view, a reference block of the first corresponding block in the second view, and a reference block of the second corresponding block in the second view; generate a first predictive block based on the first corresponding block, the reference block of the current block, and the reference block of the first corresponding block; generate a second predictive block based on the second corresponding block, the reference block of the current block, and the reference block of the second corresponding block.

In another example, a device for coding video includes a video coder configured to determine a current block of a first view is coded using an advanced residual prediction (ARP) mode, wherein the current block is bi-directionally predicted; for a luma block of the current block, performing ARP for a first prediction direction to determine a first predictive block of the luma block; for the luma block of the current block, perform ARP for a second prediction direction to determine a second predictive block of the luma block;

and, for a chroma block of the current block, performing ARP for only one of the first prediction direction or the second prediction direction to determine a first predictive block of the chroma block.

In another example, a device for coding video includes a video coder configured to determine a current block of a first view is coded using an advanced residual prediction (ARP) mode; for a luma block of the current block, performing ARP to determine a predictive block of the luma block; and, for a chroma block of the current block, determining whether to perform ARP for the chroma block based on a size of the chroma block.

In another example, an apparatus for coding video data includes means for determining that a current block of a first view is coded using an advanced residual prediction (ARP) mode, wherein the current block is bi-directionally predicted; means for determining a first disparity motion vector and a second disparity motion vector for the current block; means for locating, with the first disparity motion vector, a first corresponding block for the current block in a second view; means for locating, with the second disparity motion vector, a second corresponding block of the current block in a second view; means for determining a motion vector from motion information of at least one of the first corresponding block of the current block and the second corresponding block of the current block; means for identifying, using the motion vector, a reference block of the current block in the first view, a reference block of the first corresponding block in the second view, and a reference block of the second corresponding block in the second view; means for generating a first predictive block based on the first corresponding block, the reference block of the current block, and the reference block of the first corresponding block; and, means for generating a second predictive block based on the second corresponding block, the reference block of the current block, and the reference block of the second corresponding block.

In another example, an apparatus for coding video data includes means for determining a current block of a first view is coded using an advanced residual prediction (ARP) mode, wherein the current block is bi-directionally predicted; for a luma block of the current block, means for performing ARP for a first prediction direction to determine a first predictive block of the luma block; for the luma block of the current block, means for performing ARP for a second prediction direction to determine a second predictive block of the luma block; and, for a chroma block of the current block, means for performing ARP for only one of the first prediction direction or the second prediction direction to determine a first predictive block of the chroma block.

In another example, an apparatus for coding video data includes means for determining a current block of a first view is coded using an advanced residual prediction (ARP) mode; for a luma block of the current block, means for performing ARP to determine a predictive block of the luma block; for a chroma block of the current block, means for determining whether to perform ARP for the chroma block based on a size of the chroma block.

The details of one or more examples are set forth in the accompanying drawings and the description below. Other features, objects, and advantages will be apparent from the description and drawings, and from the claims.

DETAILED DESCRIPTION

Figure 1:
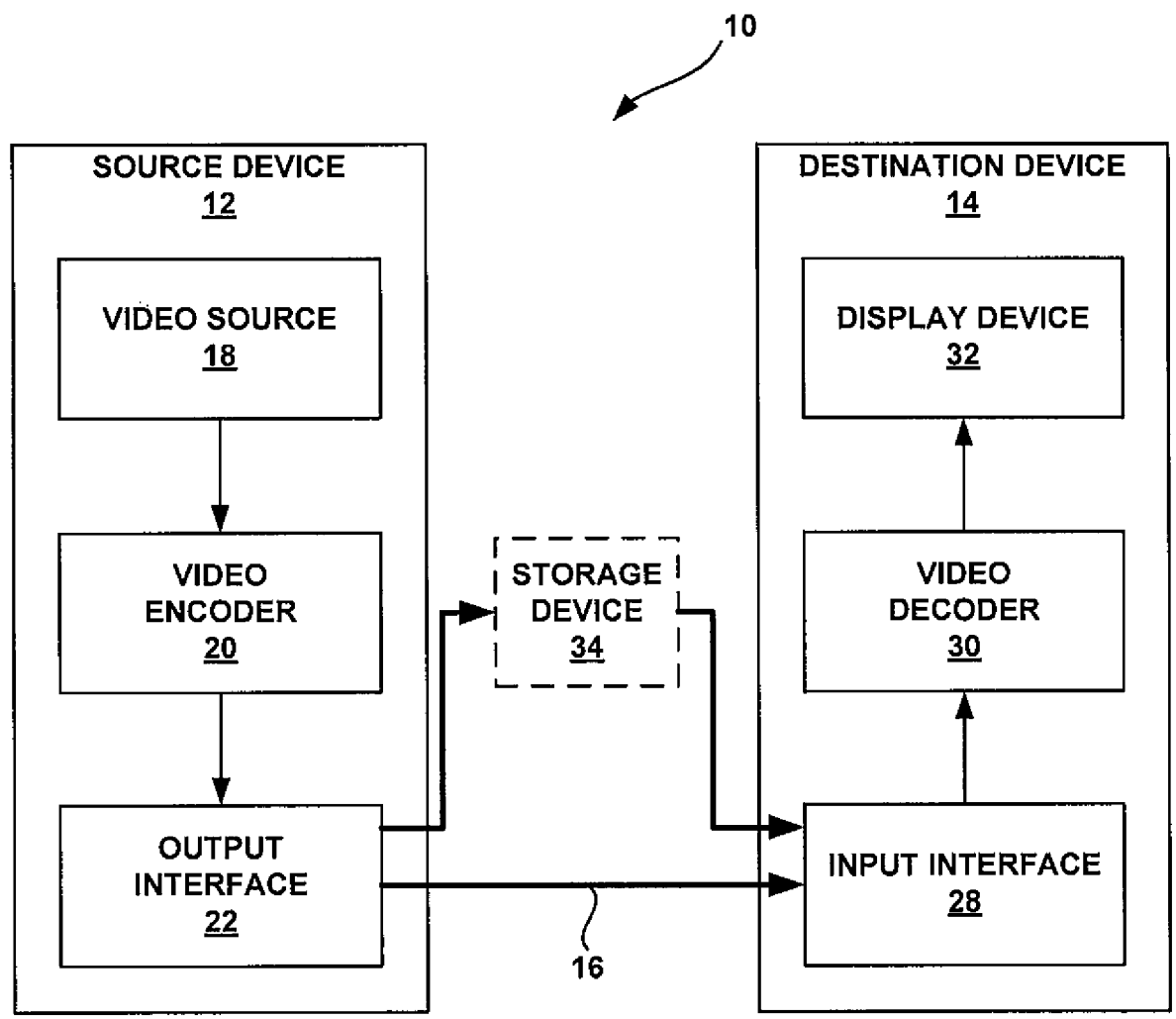
FIG. 1 is a block diagram illustrating an example video encoding and decoding system that may utilize the techniques described in this disclosure.

This disclosure introduces techniques related to advanced residual prediction (ARP) for 3D-HEVC. The techniques of this disclosure may be performed by a video coder, such as a video encoder or a video decoder. In ARP, a video coder generates a residual predictor based on a difference between already coded images. The video coder then adds this residual predictor to an original predictive block to generate a final predictive block. The final predictive block, which includes the residual predictor, is potentially a better predictor, i.e. more closely resembles the block being predicted, than the original predictor.

There are generally two types of ARP, referred to in this disclosure as temporal ARP and inter-view ARP. In temporal ARP, for a current block in a first view, a video coder locates a corresponding block in a second view using a disparity vector for the current block. In this disclosure, this corresponding block in the second view will be referred to as a base block. Using a temporal motion vector of the current block, a video coder locates a reference block of the current block in a different picture of the first view. In this disclosure, this block is referred to as a current reference block. Using the same temporal motion vector used to identify the current reference block, a video coder locates a reference block of the base block in a picture of the second view. In this disclosure, this block will be referred to as a reference base block. The difference between the base block and the base reference block can be calculated as a residual predictor. The video coder then adds the residual predictor, possibly with a weighting factor, to the current reference block to determine a final predictor.

In inter-view ARP, for a current block in a first view, a video coder locates a corresponding block in a second view using a disparity motion vector for the current block. Using a temporal motion vector of the base block, the video coder locates a reference base block of the base block in a different picture of the second view. Using the same temporal motion vector used to identify the base reference block, the video coder identifies a current reference block of the current block in a picture of the first view. The video coder calculates the difference between the current reference block and the base reference block and used calculated difference as a residual predictor. The video coder then adds this residual predictor, possibly with a weighting factor, to the base block to determine a final predictor.

When a video coder codes a bi-directionally predicted block using ARP, the video coder must assess additional reference blocks for the two prediction directions, increasing overall complexity. When a video coder codes a block using ARP, ARP may be used to code both chroma components of the block and luma components of the block, further increasing overall complexity. This disclosure introduces several potential simplifications to known ARP techniques. In one example, according to the techniques of this disclosure, when performing inter-view ARP for a bi-directionally predicted block, the video coder may determine a motion vector for a first corresponding block as part of performing ARP for a first prediction direction and reuse that determined motion vector when performing ARP for a second prediction direction. According to another example, for a bi-directionally predicted block, a video coder may apply ARP in only one direction for a chroma component of a block but apply ARP in two directions for a luma component of the block. According to another example, a video coder may selectively apply ARP to chroma components based on block size. These simplifications, as well as other techniques included in this disclosure, may reduce overall coding complexity.

FIG. 1 is a block diagram illustrating an example video encoding and decoding system 10 that may be configured to perform the ARP techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming devices, or the like. In some cases, source device 12 and destination device 14 may be equipped for wireless communication.

System 10 may operate in accordance with different video coding standards, a proprietary standard, or any other way of multiview coding. The following describes a few examples of video coding standards, and should not be considered limiting. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The latest joint draft of MVC is described in "Advanced video coding for generic audiovisual services," ITU-T Recommendation H.264, March 2010, the entire content of which is incorporated herein by reference. Another joint draft of the MVC is described in "Advanced video coding for generic audiovisual services," ITU-T Recommendation H.264, June 2011, the entire content of which is incorporated herein by reference. Some additional video coding standards include the MVC+D and 3D-AVC, which are based on AVC. In addition, a new video coding standard, namely the High-Efficiency Video Coding (HEVC), has been developed by the Joint Collaboration Team on Video Coding (JCT-VC) of ITU-T Video Coding Experts Group (VCEG) and ISO/IEC Motion Picture Experts Group (MPEG).

For purposes of illustration only, the techniques described in this disclosure are described with examples in accordance the H.264 standard, such as the 3D-AVC. However, the techniques described in this disclosure should not be considered limited to these example standards, and may be extendable to other video coding standards for multiview coding or 3D video coding (e.g., 3D-HEVC), or to techniques related to multiview coding or 3D video coding that are not necessarily based on a particular video coding standard. For example, the techniques described in this disclosure are implemented by video encoders/decoders (codecs) for multiview coding, where multiview coding includes coding of two or more views.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 34. Similarly, encoded data may be accessed from storage device 34 by input interface. Storage device 34 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 34 may correspond to a file server or another intermediate storage device that may hold the encoded video generated by source device 12. Destination device 14 may access stored video data from storage device 34 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 34 may be a streaming transmission, a download transmission, or a combination of both.

The techniques of this disclosure for ARP are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. As will be explained in greater detail below, video encoder 20 may be configured to perform the ARP techniques described in this disclosure. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 34 for later access by destination device 14 or other devices, for decoding and/or playback.

Destination device 14 includes an input interface 28, a video decoder 30, and a display device 32. As will be explained in greater detail below, video decoder 30 may be configured to perform the ARP techniques described in this disclosure. In some cases, input interface 28 may include a receiver and/or a modem. Input interface 28 of destination device 14 receives the encoded video data over link 16. The encoded video data communicated over link 16, or provided on storage device 34, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. For example, the techniques described in this disclosure may be described from the perspective of an apparatus or a device. As one example, the apparatus or device may include video decoder 30 (e.g., destination device 14 as part of a wireless communication device), and video decoder 30 may include one or more processors configured to implement techniques described in this disclosure (e.g., decode video data in accordance with techniques described in this disclosure). As another example, the apparatus or device may include a micro-processor or an integrated circuit (IC) that includes video decoder 30, and the micro-processor or IC may be part of destination device 14 or another type of device. The same may apply for video encoder 20 (i.e., an apparatus or device like source device 12 and/or a micro-controller or IC includes video encoder 20, where video encoder 20 is configured to encode video data in accordance with techniques described in this disclosure).

When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

A video sequence typically includes a series of video pictures from a view. A group of pictures (GOP) generally comprises a series of one or more video pictures. A GOP may include syntax data in a header of the GOP, a header of one or more pictures of the GOP, or elsewhere, that describes a number of pictures included in the GOP. Each picture may include picture syntax data that describes an encoding mode for the respective picture. Video encoder 20 typically operates on video blocks within individual video pictures in order to encode the video data. A video block may correspond to a macroblock, a partition of a macroblock, and possibly a sub-block of a partition, as defined in the H.264 standard. The video blocks may have fixed or varying sizes, and may differ in size according to a specified coding standard. Each video picture may include a plurality of slices. Each slice may include a plurality of blocks.

As an example, the ITU-T H.264 standard supports intra-prediction in various block sizes, such as 16 by 16, 8 by 8, or 4 by 4 for luma components, and 8×8 for chroma components, as well as inter-prediction in various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions (e.g., 16×16 pixels or 16 by 16 pixels). In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

When the block is intra-mode encoded (e.g., intra-predicted), the block may include data describing an intra-prediction mode for the block. As another example, when the block is inter-mode encoded (e.g., inter-predicted), the block may include information defining a motion vector for the block. This motion vector refers to a reference picture in the same view (e.g., a temporal motion vector), or refers to a reference picture in another view (e.g., a disparity motion vector). The data defining the motion vector for a block describes, for example, a horizontal component of the motion vector, a vertical component of the motion vector, a resolution for the motion vector (e.g., one-quarter pixel precision or one-eighth pixel precision). In addition, when inter-predicted, the block may include reference index information such as a reference picture to which the motion vector points, and/or a reference picture list (e.g., RefPicList0 or RefPicList1) for the motion vector.

In the H.264 standard, following intra-predictive or inter-predictive coding, video encoder 20 calculates residual data for the macroblocks. The residual data may correspond to pixel differences between pixels of the unencoded picture and prediction values for the macroblock in H.264.

Following any transforms to produce transform coefficients, video encoder 20 performs quantization of the transform coefficients, in some examples. Quantization generally refers to a process in which transform coefficients are quantized to possibly reduce the amount of data used to represent the coefficients, providing further compression. The quantization process reduces the bit depth associated with some or all of the coefficients. For example, an n-bit value is rounded down to an m-bit value during quantization, where n is greater than m.

In some examples, video encoder 20 utilizes a predefined scan order to scan the quantized transform coefficients to produce a serialized vector that can be entropy encoded. In other examples, video encoder 20 performs an adaptive scan. After scanning the quantized transform coefficients to form a one-dimensional vector, in some examples, video encoder 20 entropy encodes the one-dimensional vector according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology, as a few examples. Video encoder 20 also entropy encodes syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video decoder 30 implements the inverse of the techniques of video encoder 20. For example, video decoder 30 decodes the encoded video bitstream and determines the residual blocks by inverse quantization and inverse transform. Video decoder 30 sums the residual blocks with blocks of previously decoded pictures to determine the pixel values for the blocks within the picture.

Certain techniques described in this disclosure may be performed by both video encoder 20 and video decoder 30. As one example, video encoder 20 may perform ARP as part of determining how to encode a block of video data and/or may perform ARP as part of a decoding loop in the video encoder. Video decoder 30 may perform the same ARP techniques performed by video encoder 20 as part of decoding the video block. This disclosure may at times refer to video decoder 30 performing certain ARP techniques described in this disclosure. It should be understood, however, that unless stated otherwise, such techniques may also be performed by video encoder 20.

As described above, the techniques described in this disclosure are directed to 3d video coding. To better understand the techniques, the following describes some H.264/AVC coding techniques, multiview video coding from the perspective of H.264/MVC extension and the High Efficiency Video Coding (HEVC) standard, and 3D-AVC techniques.

For H.264/Advance Video Coding (AVC), video encoding or decoding (e.g., coding) is implemented on macroblocks, where a macroblock represents a portion of a frame which are inter-predicted or intra-predicted (i.e., inter-prediction encoded or decoded or intra-prediction encoded or decoded). For instance, in H.264/AVC, each inter Macroblock (MB) (e.g., inter-predicted macroblock) may be partitioned in four different ways: one 16×16 MB partition, two 16×8 MB partitions, two 8×16 MB partitions, or four 8×8 MB partitions. Different MB partitions in one MB may have different reference index values for each direction (i.e., RefPicList0 or RefPicList1). When a MB is not partitioned into multiple (more than 1) MB partitions, it has only one motion vector for the whole MB partition in each direction.

As part of video coding (encoding or decoding), video coder 20/30 may be configured to construct one or two reference picture lists, referred to as RefPicList0 and RefPicList1. The reference picture list(s) identify reference pictures that can be used to inter-predict macroblocks of a frame or a slice. For instance, video encoder 20 may signal a reference index and a reference picture list identifier. Video decoder 30 may receive the reference index and the reference picture list identifier and determine the reference picture that is to be used for inter-prediction decoding the current macroblock from the reference index and the reference picture list identifier.

When a MB is partitioned into four 8×8 MB partitions, each 8×8 MB partition can be further partitioned into sub-blocks. There are four different ways to get sub-blocks from an 8×8 MB partition: one 8×8 sub-block, two 8×4 sub-blocks, two 4×8 sub-blocks, or four 4×4 sub-blocks. Each sub-block can have a different motion vector in each direction, but shares the same reference picture index for each direction. The manner in which an 8×8 MB partition is partitioned into sub-blocks is named sub-block partition.

This disclosure will generally use the term block to refer to any block of video data. For example, in the context of H.264 coding and its extensions, a block may refer to any of macroblocks, macroblock partitions, sub-blocks, or any other types of blocks. In the context of HEVC and its extensions, a block may refer to any of PUs, TUs, CUs, or any other types of blocks. A sub-block as used in this disclosure generally refers to any portion of a larger block. A sub-block may also itself be referred to simply as a block.

For multiview video coding there are multiple different video coding standards. To avoid confusion, when this disclosure describes multiview video coding generically, this disclosure uses the phrase "multiview video coding." In general, in multiview video coding, there is a base view and one or more non-base or dependent views. The base view is fully decodable without reference to any of the dependent views (i.e., the base view is only inter-predicted with temporal motion vectors). This allows a codec that is not configured for multiview video coding to still receive at least one view that is fully decodable (i.e., the base view can be extracted out and the other views discarded, allowing a decoder not configured for multiview video coding to still decode the video content albeit without 3D experience). The one or more dependent views may be inter-predicted with respect to the base view or with respect to another dependent view (i.e., disparity compensation predicted), or with respect to other pictures in the same view (i.e., motion compensated predicted).

Whereas "multiview video coding" is used generically, the acronym MVC is associated with an extension of H.264/AVC. Accordingly, when the disclosure uses the acronym MVC, the disclosure is referring specifically to the extension to H.264/AVC video coding standard. The MVC extension of H.264/AVC relies upon disparity motion vectors as another type of motion vector in addition to temporal motion vectors. Another video coding standard, referred to as MVC plus depth (MVC+D), has also been developed by JCT-3V and MPEG. MVC+D applies the same low-level coding tools as those of MVC for both texture and depth, with the decoding of depth being independent to the decoding of texture and vice-versa. For instance, in MVC, a frame is represented only by one view component, referred to as a texture view component, or simply texture. In MVC+D, there are two view components: texture view component and depth view component, or simply texture and depth. For example, in MVC+D, each view includes a texture view and a depth view, where the view includes a plurality of view components, the texture view includes a plurality of texture view components, and the depth view includes a plurality of depth view components.

Each texture view component is associated with a depth view component to form a view component of a view. The depth view component represents relative depth of the objects in the texture view component. In MVC+D, the depth view component and the texture view component are separately decodable. For example, video decoder 30 may implement two instances of an MVC codec, in which a first codec decodes the texture view components and a second codec decodes the depth view components. These two codecs can execute independent of one another because the texture view components and the depth view components are separately encoded.

In MVC+D, a depth view component is always immediately following the associated (e.g., corresponding) texture view component. In this manner, MVC+D supports texture-first coding, where the texture view component is decoded prior to the depth view component.

A texture view component and its associated (e.g., corresponding) depth view component may include the same picture order count (POC) value and view_id (i.e., the POC value and view_id of a texture view component and its associated depth view component is the same). The POC value indicates the display order of the texture view component and the view_id indicates the view to which the texture view component and depth view component belong.

Figure 2:
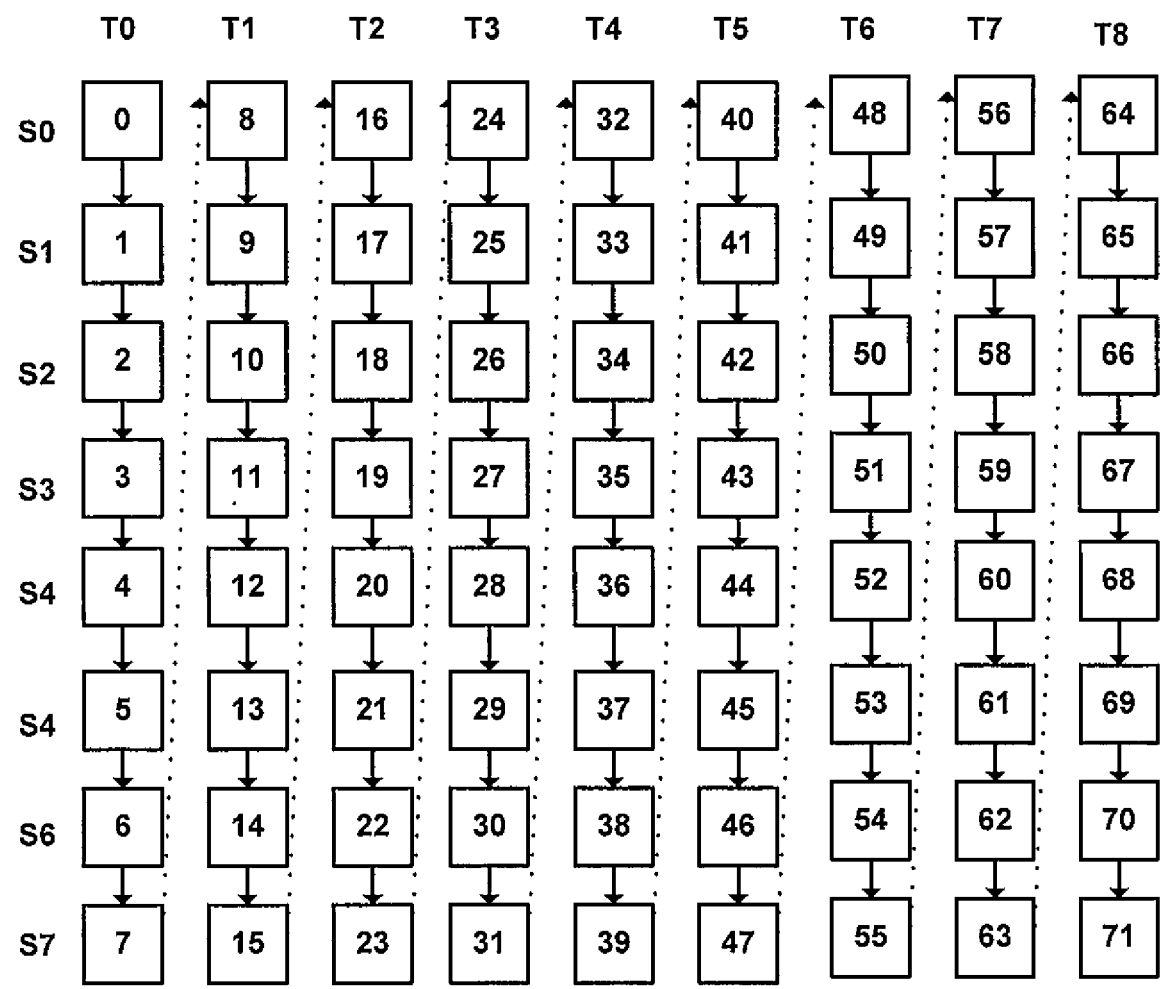
FIG. 2 is a conceptual diagram illustrating an example multiview decoding order.

FIG. 2 shows a typical MVC decoding order (i.e. bitstream order). The decoding order arrangement is referred as time-first coding. Note that the decoding order of access units may not be identical to the output or display order. In FIG. 2, S0-S7 each refers to different views of the multiview video. T0-T8 each represents one output time instance. An access unit may include the coded pictures of all the views for one output time instance. For example, a first access unit may include all of the views S0-S7 for time instance T0, a second access unit may include all of the views S0-S7 for time instance T1, and so forth.

For purposes of brevity, the disclosure may use the following definitions:

view component: A coded representation of a view in a single access unit. When a view includes both coded texture and depth representations, a view component may include a texture view component and a depth view component.

texture view component: A coded representation of the texture of a view in a single access unit.

depth view component: A coded representation of the depth of a view in a single access unit.

As discussed above, in the context of this disclosure, the view component, texture view component, and depth vide component may be generally referred to as a layer. In FIG. 2, each of the views includes sets of pictures. For example, view S0 includes set of pictures 0, 8, 16, 24, 32, 40, 48, 56, and 64, view S1 includes set of pictures 1, 9, 17, 25, 33, 41, 49, 57, and 65, and so forth. Each set includes two pictures: one picture is referred to as a texture view component, and the other picture is referred to as a depth view component. The texture view component and the depth view component within a set of pictures of a view may be considered as corresponding to one another. For example, the texture view component within a set of pictures of a view is considered as corresponding to the depth view component within the set of the pictures of the view, and vice-versa (i.e., the depth view component corresponds to its texture view component in the set, and vice-versa). As used in this disclosure, a texture view component that corresponds to a depth view component may be considered as the texture view component and the depth view component being part of a same view of a single access unit.

The texture view component includes the actual image content that is displayed. For example, the texture view component may include luma (Y) and chroma (Cb and Cr) components. The depth view component may indicate relative depths of the pixels in its corresponding texture view component. As one example analogy, the depth view component is like a gray scale image that includes only luma values. In other words, the depth view component may not convey any image content, but rather provide a measure of the relative depths of the pixels in the texture view component.

For example, a purely white pixel in the depth view component indicates that its corresponding pixel or pixels in the corresponding texture view component is closer from the perspective of the viewer, and a purely black pixel in the depth view component indicates that its corresponding pixel or pixels in the corresponding texture view component is further away from the perspective of the viewer. The various shades of gray in between black and white indicate different depth levels. For instance, a very gray pixel in the depth view component indicates that its corresponding pixel in the texture view component is further away than a slightly gray pixel in the depth view component. Because only gray scale is needed to identify the depth of pixels, the depth view component need not include chroma components, as color values for the depth view component may not serve any purpose. The above explanation is intended to be an analogy for purposes of relating depth images to texture images. The depth values in a depth image do not in fact represent shades of gray, but in fact, represent 8-bit, or other bit size, depth values.

The depth view component using only luma values (e.g., intensity values) to identify depth is provided for illustration purposes and should not be considered limiting. In other examples, any technique may be utilized to indicate relative depths of the pixels in the texture view component.

Figure 3:
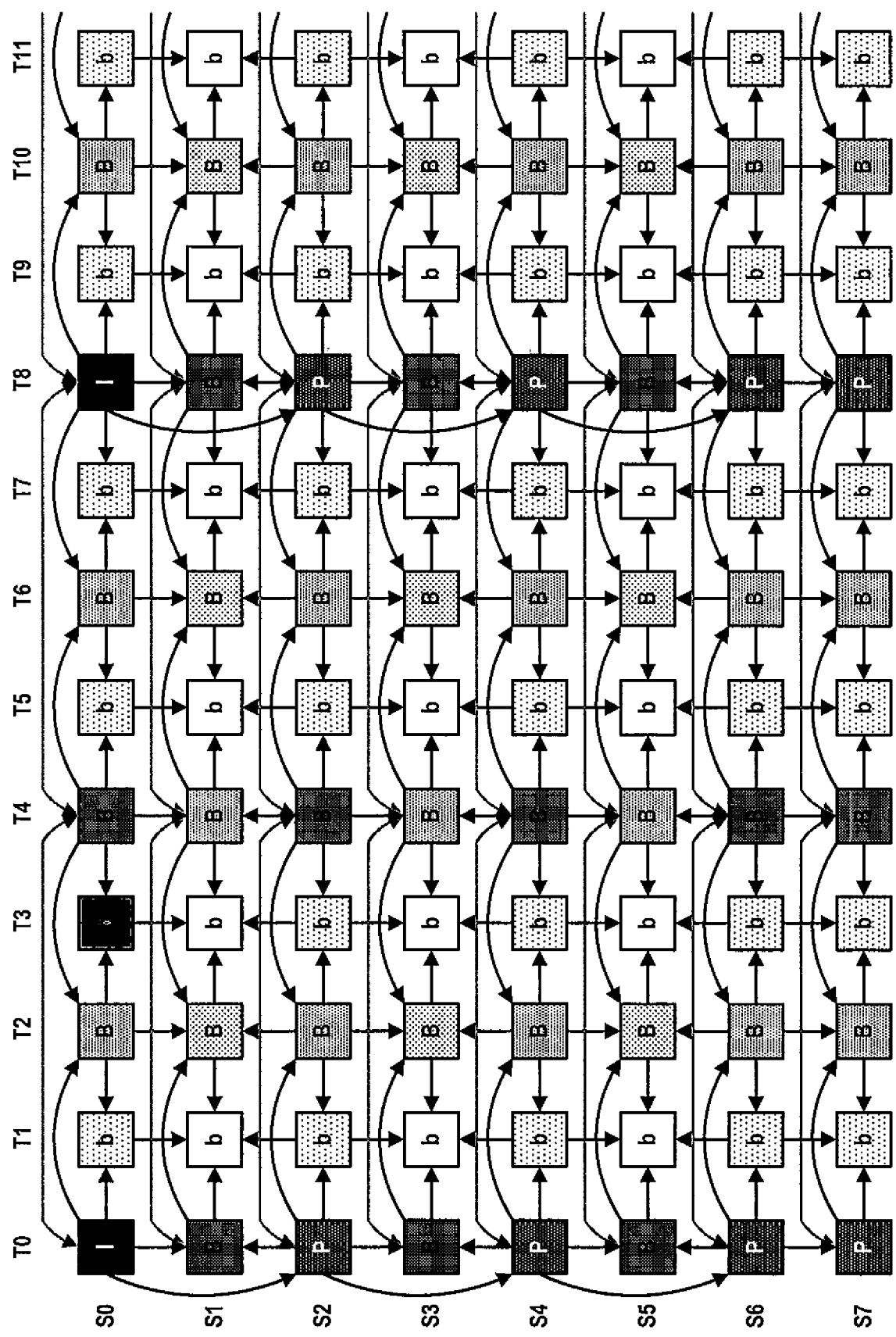
FIG. 3 is a conceptual diagram illustrating an example prediction structure for multiview coding.

FIG. 3 shows a typical MVC prediction structure (including both inter-picture prediction within each view and inter-view prediction between views) for multi-view video coding. Prediction directions are indicated by arrows, the pointed-to object using the pointed-from object as the prediction reference. In MVC, inter-view prediction is supported by disparity motion compensation, which uses the syntax of the H.264/AVC motion compensation, but allows a picture in a different view to be used as a reference picture.

In the example of FIG. 3, eight views (having view IDs "S0" through "S7") are illustrated, and twelve temporal locations ("T0" through "T11") are illustrated for each view. That is, each row in FIG. 3 corresponds to a view, while each column indicates a temporal location.

Although MVC has a so-called base view, which is decodable by H.264/AVC decoders, and stereo view pairs may also be supported by MVC, the advantage of MVC is that it could support an example that uses more than two views as a 3D video input and decodes this 3D video represented by the multiple views. A renderer of a client having an MVC decoder may expect 3D video content with multiple views.

Pictures in FIG. 3 are indicated at the intersection of each row and each column. The H.264/AVC standard may use the term frame to represent a portion of the video. This disclosure may use the term picture and frame interchangeably.

The pictures in FIG. 3 are illustrated using a block including a letter, the letter designating whether the corresponding picture is intra-coded (that is, an I-picture), or inter-coded in one direction (that is, as a P-picture) or in multiple directions (that is, as a B-picture). In general, predictions are indicated by arrows, where the pointed-to pictures use the pointed-from picture for prediction reference. For example, the P-picture of view S2 at temporal location T0 is predicted from the I-picture of view S0 at temporal location T0.

As with single view video encoding, pictures of a multi-view video coding video sequence may be predictively encoded with respect to pictures at different temporal locations. For example, the b-picture of view S0 at temporal location T1 has an arrow pointed to it from the I-picture of view S0 at temporal location T0, indicating that the b-picture is predicted from the I-picture. Additionally, however, in the context of multiview video encoding, pictures may be inter-view predicted. That is, a view component can use the view components in other views for reference. In MVC, for example, inter-view prediction is realized as if the view component in another view is an inter-prediction reference. The potential inter-view references are signaled in the Sequence Parameter Set (SPS) MVC extension and can be modified by the reference picture list construction process, which enables flexible ordering of the inter-prediction or inter-view prediction references. Inter-view prediction is also a feature of proposed multiview extension of HEVC, including 3D-HEVC (multiview plus depth).

FIG. 3 provides various examples of inter-view prediction. Pictures of view S1, in the example of FIG. 3, are illustrated as being predicted from pictures at different temporal locations of view S1, as well as inter-view predicted from pictures of views S0 and S2 at the same temporal locations. For example, the b-picture of view S1 at temporal location T1 is predicted from each of the B-pictures of view S1 at temporal locations T0 and T2, as well as the b-pictures of views S0 and S2 at temporal location T1.

In some examples, FIG. 3 may be viewed as illustrating the texture view components. For example, the I-, P-, B-, and b-pictures illustrated in FIG. 2 may be considered as texture view components for each of the views. In accordance with the techniques described in this disclosure, for each of the texture view components illustrated in FIG. 3 there is a corresponding depth view component. In some examples, the depth view components may be predicted in a manner similar to that illustrated in FIG. 3 for the corresponding texture view components.

Coding of two views may also be supported by MVC. One of the advantages of MVC is that an MVC encoder may take more than two views as a 3D video input and an MVC decoder may decode such a multiview representation. As such, any renderer with an MVC decoder may decode 3D video content with more than two views.

As discussed above, in MVC, inter-view prediction is allowed among pictures in the same access unit (meaning, in some instances, with the same time instance). When coding a picture in one of the non-base views, a picture may be added into a reference picture list, if it is in a different view but within a same time instance. An inter-view prediction reference picture may be put in any position of a reference picture list, just like any inter-prediction reference picture. As shown in FIG. 3, a view component can use the view components in other views for reference. In MVC, inter-view prediction is realized as if the view component in another view was an inter-prediction reference.

In MVC, inter-view prediction is allowed among pictures in the same access unit (i.e., with the same time instance). When coding a picture in one of the non-base views, a picture may be added into a reference picture list, if it is in a different view but with a same time instance. An inter-view prediction reference picture can be put in any position of a reference picture list, just like any inter prediction reference picture.

As shown in FIG. 3, a view component can use the view components in other views for reference. This is called inter-view prediction. In MVC, inter-view prediction is realized as if the view component in another view was an inter prediction reference.

In the context of multiview video coding, there are two kinds of motion vectors one is a normal motion vector pointing to temporal reference pictures. The corresponding temporal inter prediction is motion-compensated prediction (MCP). The other type of motion vector is a disparity motion vector pointing to pictures in a different view (i.e., inter-view reference pictures). The corresponding inter prediction is disparity-compensated prediction (DCP).

Video decoder 30 may decode video using multiple HEVC inter coding modes. In HEVC standard, there are two inter prediction modes, named merge (skip is considered as a special case of merge) and advanced motion vector prediction (AMVP) modes respectively for a prediction unit (PU). In either AMVP or merge mode, video decoder 30 maintains a motion vector (MV) candidate list for multiple motion vector predictors. The motion vector(s), as well as reference indices in the merge mode, of the current PU may be generated by taking one candidate from the MV candidate list.

The MV candidate list contains, for example, up to five candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode for each potential prediction direction from either list 0 or list 1, a reference index needs to be explicitly signaled, together with an MVP index to the MV candidate list since the AMVP candidate contains only a motion vector. In AMVP mode, motion vector difference between selected motion vector and motion vector predictor corresponding to the MVP index is further signaled. As can be seen above, a merge candidate corresponds to a full set of motion information while an AMVP candidate contains just one motion vector for a specific prediction direction and reference index.

As introduced above, video decoder 30 may decode video that coded according to the HEVC-based 3D video coding standard. Currently, a Joint Collaboration Team on 3D Video Coding (JCT-3C) of VCEG and MPEG is developing a 3DV standard based on HEVC, for which part of the standardization efforts includes the standardization of the multiview video codec based on HEVC (MV-HEVC) and another part for 3D Video coding based on HEVC (3D-HEVC). For 3D-HEVC, new coding tools, including those in coding unit/prediction unit level, for both texture and depth views may be included and supported. The latest software 3D-HTM for 3D-HEVC can be downloaded from the following link: [3D-HTM version 9.0r1]: https://hevc.h-hi.fraunhofer.de/svn/svn_3DVCSoftware/tags/HTM-9.0r1/

The latest reference software description is to be available as follows: Li Zhang, Gerhard Tech, Krzysztof Wegner, Sehoon Yea, "Test Model 6 of 3D-HEVC and MV-HEVC," JCT3V-F1005, Joint Collaborative Team on 3D Video Coding Extension Development of ITU-T SG 16 WP 3 and ISO/IEC JTC 1/SC 29/WG 11, 6th Meeting: Geneva, CH, November 2013. It could be downloaded from the following link: http://phenix.it-sudparis.eu/jct2/doc_end_user/current_document.php?id=1636

The latest working draft of 3D-HEVC is available as follows: Gerhard Tech, Krzysztof Wegner, Ying Chen, Sehoon Yea, "3D-HEVC Draft Text 2," JCT3V-F1001, Joint Collaborative Team on 3D Video Coding Extension Development of ITU-T SG 16 WP 3 and ISO/IEC JTC 1/SC 29/WG 11, 6th Meeting: Geneva, CH, November 2013. It could be downloaded from the following link: http://phenix.it-sudparis.eu/jct2/doc_end_user/documents/6_Geneva/wg11/JCT3V-F1001-v4.zip As part of decoding video according to the HEVC standard, video decoder 30 may be configured to perform Neighboring Block Based Disparity Vector Derivation (NBDV). NBDV is a disparity vector derivation method in 3D-HEVC that uses the texture-first coding order for all the views. In the current 3D-HEVC design, the disparity vector derived from NBDV may be further refined by retrieving the depth data from reference view's depth map.

Video decoder 30 may use a disparity vector (DV) as an estimator of the displacement between two views. Because neighboring blocks share almost the same motion/disparity information in video coding, the current block can use the motion vector information in neighboring blocks as a good predictor. Following this idea, NBDV uses the neighboring disparity information for estimating the disparity vector in different views.

As part of performing NBDV, several spatial and temporal neighboring blocks are firstly defined. Video decoder 30 may then check each of them in a pre-defined order determined by the priority of the correlation between the current block and the candidate block. Once a disparity motion vector (i.e., the motion vector points to an inter-view reference picture) is found in the candidates, the disparity motion vector is converted to a disparity vector and the associated view order index is also returned. Two sets of neighboring blocks are utilized. One set is from spatial neighboring blocks and the other set is from temporal neighboring blocks.

3D-HEVC first adopted the NBDV method proposed in JCT3V-A0097. Implicit disparity vectors were included with a simplified NBDV in JCTVC-A0126. Additionally, in JCT3V-B0047, NBDV is further simplified by removing the implicit disparity vectors stored in the decoded picture buffer, but also improved a coding gain with the RAP picture selection. The following documents describe aspects of 3D-HEVC and NDBV.

- JCT3V-A0097: 3D-CE5.h: Disparity vector generation results, L. Zhang, Y. Chen, M. Karczewicz (Qualcomm)
- JCT3V-A0126: 3D-CE5.h: Simplification of disparity vector derivation for HEVC-based 3D video coding, J. Sung, M. Koo, S. Yea (LG)
- JCT3V-B0047: 3D-CE5.h related: Improvements for disparity vector derivation, J. Kang, Y. Chen, L. Zhang, M. Karczewicz (Qualcomm)
- JCT3V-D0181: CE2: CU-based Disparity Vector Derivation in 3D-HEVC, J. Kang, Y. Chen, L. Zhang, M. Karczewicz (Qualcomm)

Figure 4:
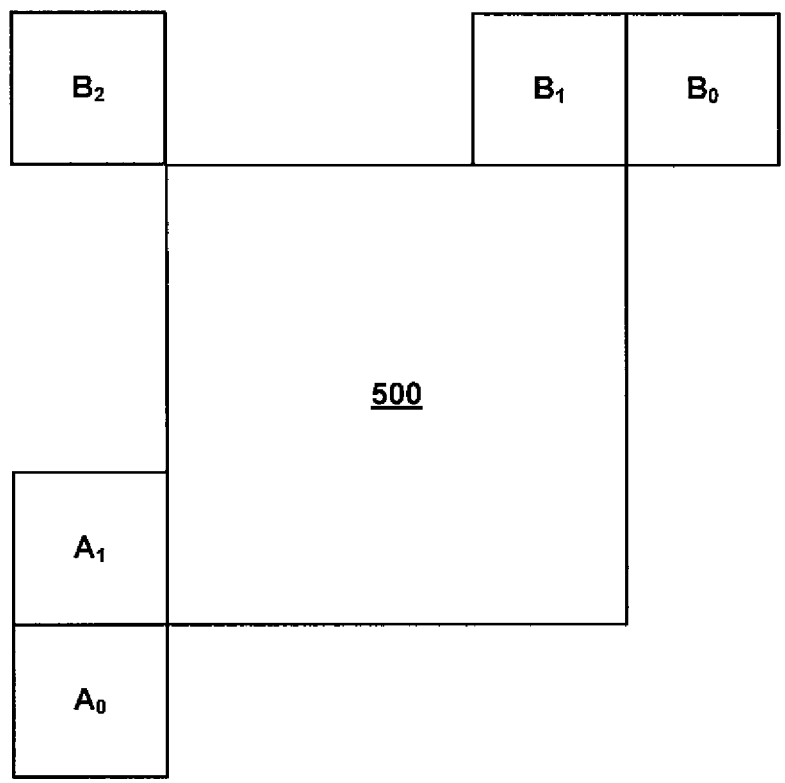
FIG. 4 shows an example of spatial neighboring blocks relative to a coding unit.

FIG. 4 shows an example of spatial motion vector neighbors relative to one coding unit. In some implementations of NBDV, five spatial neighboring blocks are used for the disparity vector derivation. They are the below-left, left, above-right, above and above-left blocks of the coding unit (CU) covering current prediction unit (PU), as denoted by A0, A1, B0, B1 or B2, as shown in FIG. 4: Spatial motion vector neighbors relative to one coding unit. It should be noted that they are the same as those used in the MERGE/AMVP modes in HEVC. Therefore, no additional memory access is required.

For checking temporal neighboring blocks, video decoder 30 performs a construction process of a candidate picture list. Up to two reference pictures from current view may be treated as candidate pictures. Co-located reference picture is first inserted to the candidate picture list, followed by the rest of candidate pictures in the ascending order of reference index. When the reference pictures with the same reference index in both reference picture lists are available, the one in the same reference picture list of the co-located picture precedes the other one. For each candidate picture in the candidate picture list, three candidate regions are determined for deriving the temporal neighboring blocks.

When a block is coded with inter-view motion prediction, video decoder 30 derives a disparity vector for selecting a corresponding block in a different view. AN implicit disparity vector (IDV or a.k.a. derived disparity vector) refers to a disparity vector derived in the inter-view motion prediction.

Even though the block is coded with motion prediction, the derived disparity vector is not discarded for the purpose of coding a following block.

In the current design of 3D-HTM 7.0 and later versions of 3D-HTM, the NBDV process checks disparity motion vectors in the temporal neighboring blocks, disparity motion vectors in the spatial neighboring blocks, and then the IDVs in order. Once, the disparity motion vector or IDV is found, the process is terminated. In addition, the number of spatial neighboring blocks checked in NBDV process is further reduced to 2.

Video decoder 30 may also perform refinement of NBDV (NBDV-R) with accessing depth information. When one disparity vector is derived from the NBDV process, it is further refined by retrieving the depth data from reference view's depth map. The refinement process includes two steps. First, video decoder 30 locates a corresponding depth block by the derived disparity vector in the previously coded reference depth view, such as the base view. The size of the corresponding depth block may be the same as that of current PU. Video decoder 30 then selects one depth value from four corner pixels of the corresponding depth block and converts it to the horizontal component of the refined disparity vector. The vertical component of the disparity vector is unchanged.

In some implementations, the refined disparity vector may, for example, be used for inter-view motion prediction while the unrefined disparity vector may be used for inter-view residual prediction. In addition, the refined disparity vector may be stored as the motion vector of one PU if it is coded with backward view synthesis prediction mode. In some implementations, the depth view component of a base view will be always accessed regardless of the value of view order index derived from the NBDV process.

Video decoder 30 may also be configured to perform ARP, which is a coding tool that exploits the residual correlation between views. In ARP, a residual predictor is produced by aligning the motion information at the current view for motion compensation in the reference view. In addition, weighting factors are introduced to compensate the quality differences between views. When ARP is enabled for one block, the difference between current residual and the residual predictor is signaled. Currently, ARP could only be applied to inter-coded CUs with partition mode equal to Part_2N×2N. ARP is applied for both the luma (Y) component and the chroma (Cb and Cr) component. In the following description, operation (such as sum, subtraction) on one block (or pixel) means operation on each component (Y, Cb and Cr) of each pixel in the block (or pixel). When there is a need to distinguish the process for luma and chroma components, the process for luma component is called luma ARP (sub-PU ARP) and the process for chroma components is called chroma ARP (sub-PU ARP).

Figure 5:
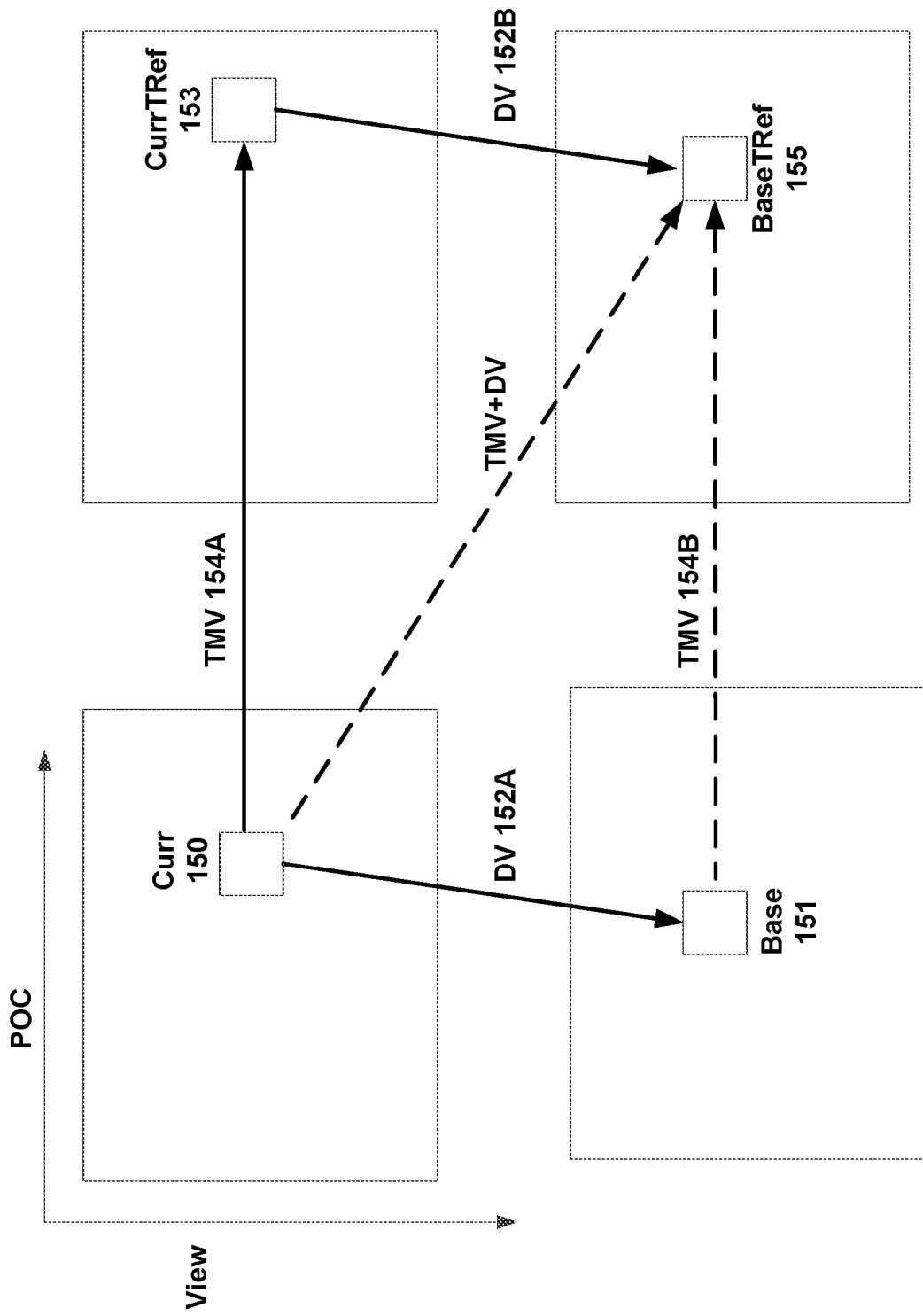
FIG. 5 shows an example prediction structure for advanced residual prediction (ARP) in 3D-HEVC.

FIG. 5 shows an example prediction structure for temporal ARP in 3D-HEVC, which was adopted in the 4$^{th}$ JCT3V meeting, as proposed in JCT3V-D0177. FIG. 5 illustrates the prediction structure of ARP for temporal residual (i.e., current reference picture in one reference picture list is a temporal reference picture) in multiview video coding.

As shown in FIG. 5, video decoder 30 identifies the following blocks in the prediction of the current block being coded. The current block is shown in FIG. 5 as Curr 150. Base 151 represents a reference block in a reference/base view derived by the disparity vector (DV 152A). CurrTRef 153 represents a block in the same view as block Curr 150 derived by a temporal motion vector (TMV 154A) of the current block. BaseTRef 155 represents a block in the same view as block Base 151 derived by the temporal motion vector of the current block (TMV 154B). Thus, TMV 154A and TMV 154B correspond to the same motion vector, meaning they identify the same amount of displacement along the x-axis and y-axis. The difference in relative location between BaseTRef 155 and Curr 150 can be expressed with a vector of TMV+DV. The difference in relative location between CurrTRef 153 and BaseTRef 155 can be expressed by the disparity vector DV 152B. TMV+DV and DV 152B are provided in FIG. 5 to show the relationship between the various blocks and do not necessarily correspond to vectors that are derived or used by video decoder 30.

When performing temporal ARP, video decoder 30 may calculate the residual predictor as BaseTRef-Base, where the subtraction operation applies to each pixel of the denoted pixel arrays. Video decoder 30 may multiply the residual predictor by a weighting factor (w). Therefore, the final predictor of the current block determined by video decoder 30 is denoted as CurrTRef+ w*(Base-BaseTRef).

The example of FIG. 5 shows the case of uni-directional prediction. When extending to the case of bi-directional prediction, video decoder 30 may apply the above steps for each reference picture list. Thus, for bi-directional prediction, video decoder 30 may determine two residual predictors for two different predictive blocks.

Figure 6:
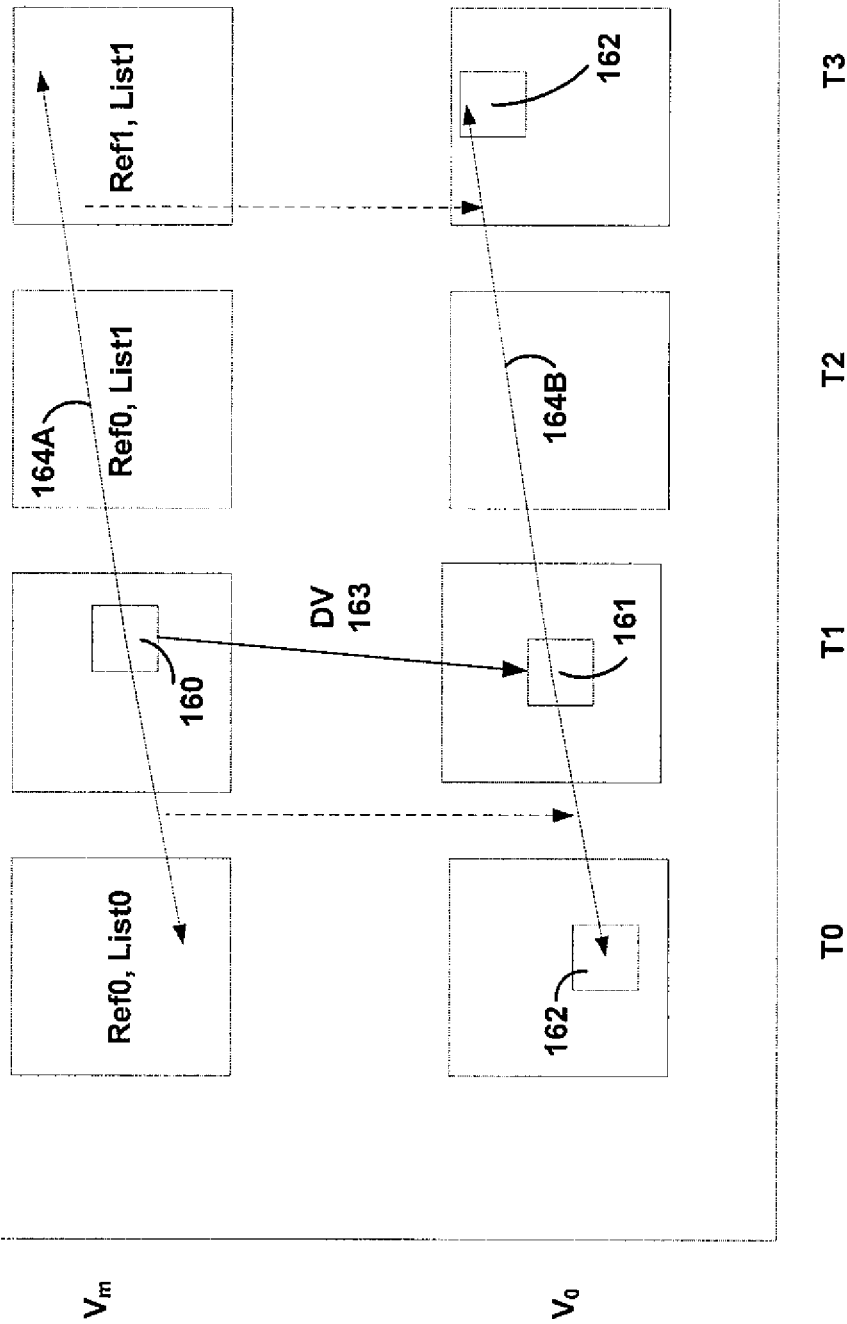
FIG. 6 shows an example relationship between a current block, reference block, and a motion compensated block in multi-view video coding.

FIG. 6 shows an example relationship between a current block 160, a corresponding block 161, and motion compensated block 162. Video decoder 30 may perform ARP by first obtaining a disparity vector (DV 163) pointing to a target reference view ($V_0$). Video decoder 30 may obtain DV 163 using, for example, any of the techniques specified in the current 3D-HEVC. In the picture of reference view $V_0$ within the same access unit, video decoder 30 may locate the corresponding block 161 using DV 163. Video decoder 30 may re-use the motion information of current block 160 to derive motion information for reference block 161. For example, if video decoder 30 used motion vector 164A was used to predict current block 160, then video decoder 30 may use motion vector 164B to predict corresponding block 161. Motion vector 164A and motion vector 164B are intended to represent two different instances of the same motion vector.

Video decoder 30 may apply motion compensation for the corresponding block 161 based on the same motion vector used to code current block 160 and derived reference picture in the reference view for the reference block, to derive a residue block. Video decoder 30 selects the reference picture in the reference view ($V_0$) which has the same POC (Picture Order Count) value as the reference picture of the current view ($V_m$) as the reference picture of the corresponding block. Video decoder 30 applies the weighting factor to the residue block to get a weighted residue block and add the values of the weighted residue block to the predicted samples.

Video decoder 30 may also be configured to perform inter-view ARP. Similar to temporal ARP, when a current prediction unit uses an inter-view reference picture, prediction of inter-view residual is enabled. First, the inter-view residual within a different access unit is calculated, then the calculated residual information may be used to predict the inter-view residual of the current block. This technique was proposed in JCT3V-F0123 and has been adopted into 3D-HEVC.

Figure 7:
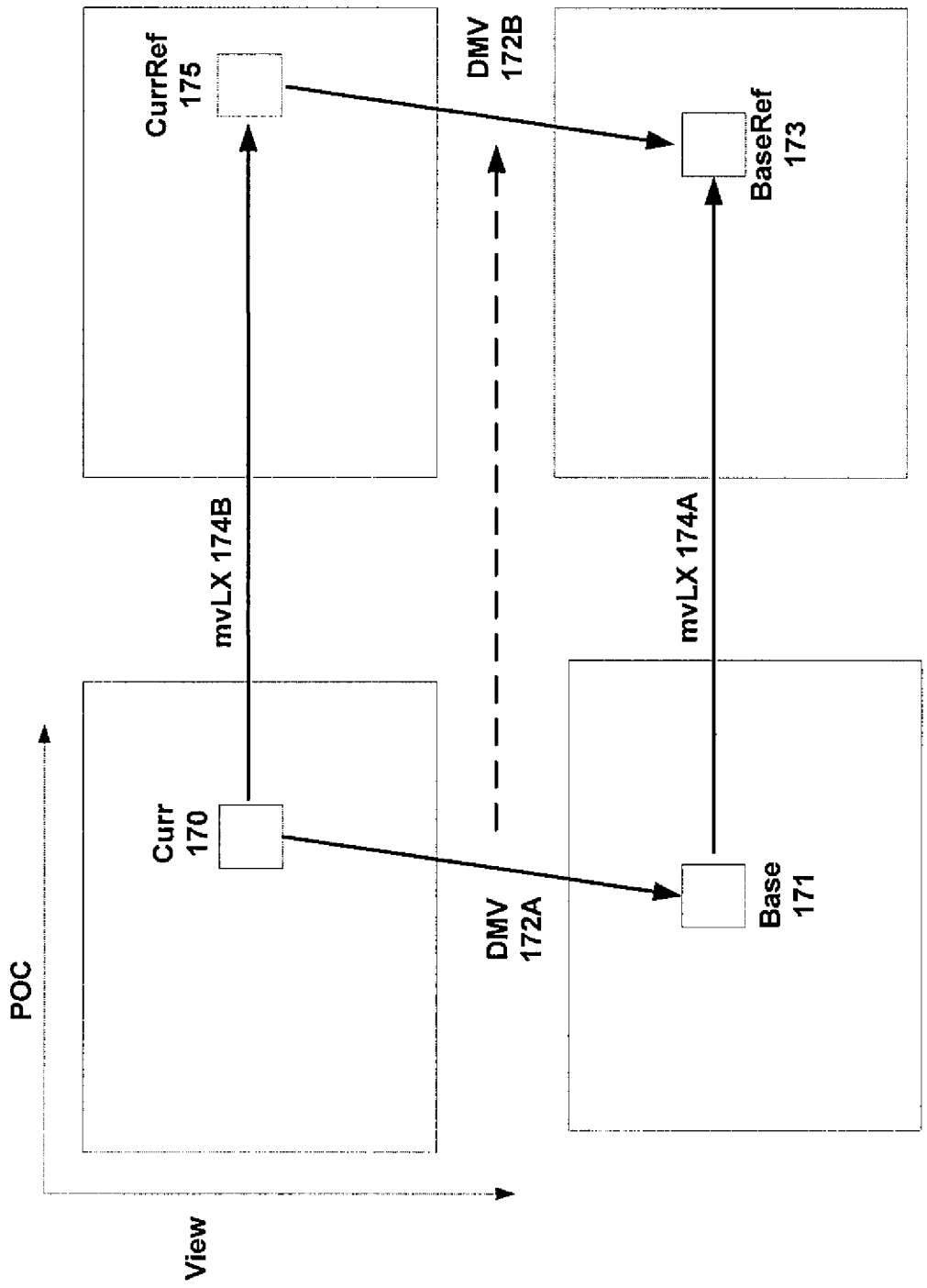
FIG. 7 shows an example of ARP for inter-view residual data.

FIG. 7 shows an example prediction structure for inter-view ARP. As shown in FIG. 7, for inter-view ARP, video decoder 30 identifies three related blocks for current block

170. Base 171 represents the reference block in the reference view located by the disparity motion vector (DMV 172A) of current block 170. BaseRef 173 represents the reference block of Base 171 in the reference view located by the temporal motion vector mvLX 174A and reference index, if available, contained by Base 171. CurrRef 175 represent a reference block in current view identified by reusing the temporal motion information from Base 171. Thus, video decoder 30 may locate CurrRef 175 using mvLX 174B, where mvLX 174A and mvLX 174B represent two instances of the same motion vector. DMV 172B is equal to DMV 172A as included in FIG. 7 to illustrate that the disparity between Curr 170 and Base 171 is equal to the disparity between CurrRef 175 and BaseRef 173. DMV 172B may not actually correspond to a disparity motion vector used or generated by video decoder 30.

With the identified three blocks, video decoder 30 may calculate the residual predictor of the residual signal for current PU (i.e. Curr 170) as the difference between CurrRef and BaseRef. Furthermore, the inter-view predictor may be multiplied by a weighting factor (w). Therefore, the final predictor of the current block (Curr 170) determined by video decoder 30 is denoted as Base+ w*(CurrRef-BaseRef).

Video decoder 30 may use bi-linear filtering to generate the three relative blocks as in some known designs of ARP for temporal residual prediction. Furthermore, when the temporal motion vector contained by Base 171 points to a reference picture that is in a different access unit of the first available temporal reference picture of current PU, video decoder 30 may scale the temporal motion vector to the first available temporal reference picture and the scaled motion vector may be used to locate two blocks in a different access unit.

When ARP is applied for inter-view residual, the current PU is using inter-view ARP, when ARP is applied for temporal residual, the current PU is using temporal ARP.

In the following description, if the corresponding reference for one reference picture list is a temporal reference picture and ARP is applied, it is denoted as temporal ARP. Otherwise, if the corresponding reference for one reference picture list is an inter-view reference picture and ARP is applied, it is denoted as inter-view ARP.

As introduced above, video decoder 30 may multiply the residual predictor by a weighting factor. Three weighting factors are typically used in ARP (i.e., 0, 0.5, and 1) although more or fewer weighting factors as well as different weighting factors may also be used. Video encoder 20 may, for example, select the weighting factor leading to minimal rate-distortion cost for the current CU as the final weighting factor and signal the corresponding weighting factor index (0, 1 and 2 which correspond to weighting factor 0, 1, and 0.5, respectively) in the bitstream at the CU level. All PU predictions in one CU may share the same weighting factor. When the weighting factor is equal to 0, ARP is not used for the current CU.

Video decoder 30 may configured to perform reference picture selection via motion vector scaling. In JCT3V-O0049, the reference pictures of prediction units coded with non-zero weighting factors may be different from block to block. Therefore, different pictures from the reference view may need to be accessed to generate the motion-compensated block (i.e., BaseTRef in FIG. 5) of the corresponding block. When the weighting factor is unequal to 0, for temporal residual, the motion vectors of the current PU is scaled towards a fixed picture before performing motion compensation for both residual and residual predictor generation processes. When ARP is applied to inter-view residual, the temporal motion vectors of the reference block (i.e., Base in FIG. 7) is scaled towards a fixed picture before performing motion compensation for both residual and residual predictor generation processes.

For both cases (i.e, temporal residual or inter-view residual), the fixed picture is defined as the first available temporal reference picture of each reference picture list. When the decoded motion vector does not point to the fixed picture, it is firstly scaled and then used to identify CurrTRef and BaseTRef.

Such a reference picture used for ARP is called target ARP reference picture. Note when current slice is a B slice, the target ARP reference picture is associated with the reference picture list. Therefore, two target ARP reference pictures may be utilized.

Video decoder 30 may perform an availability check of target ARP reference pictures. The target ARP reference picture associated with one reference picture list X (with X being 0 or 1) may be denoted by RpRefPicLX, and the picture in the view with view order index equal to the one derived from NBDV process and with the same POC value of RpRefPicLX may be denoted by RefPicInRefViewLX. When one of the following conditions is false, video decoder 30 may disable ARP disabled for reference picture list X: (1) RpRefPicLX is unavailable, (2) RefPicInRefViewLX is not stored in decoded picture buffer, (3) RefPicInRefViewLX is not included in any of the reference picture lists of the corresponding block (i.e, Base in FIG. 5 and FIG. 7) located by the DV from NBDV process or DMV associated with current block, ARP may be disabled for this reference picture list.

When ARP is applied, video decoder 30 may use a bi-linear filter when generating the residual and residual predictor. That is, the three blocks exclude current block involved in the ARP process may be generated using bi-linear filter.

Video decoder 30 may also perform block-level ARP. In contrast to the above description where all blocks within one PU share the same motion information, sometimes referred to as PU-level ARP, in block-level ARP, video decoder 30 splits one PU into several 8×8 blocks, and each 8×8 block has its own motion information to perform ARP. When block-level ARP, either temporal or inter-view, is enabled, each PU is firstly split into several blocks, and each block shares the same motion information as the current PU. However, the derived motion vector (i.e., disparity vector in temporal ARP or temporal motion vector in inter-view ARP) may be updated for each 8×8 block.

Figure 8A:
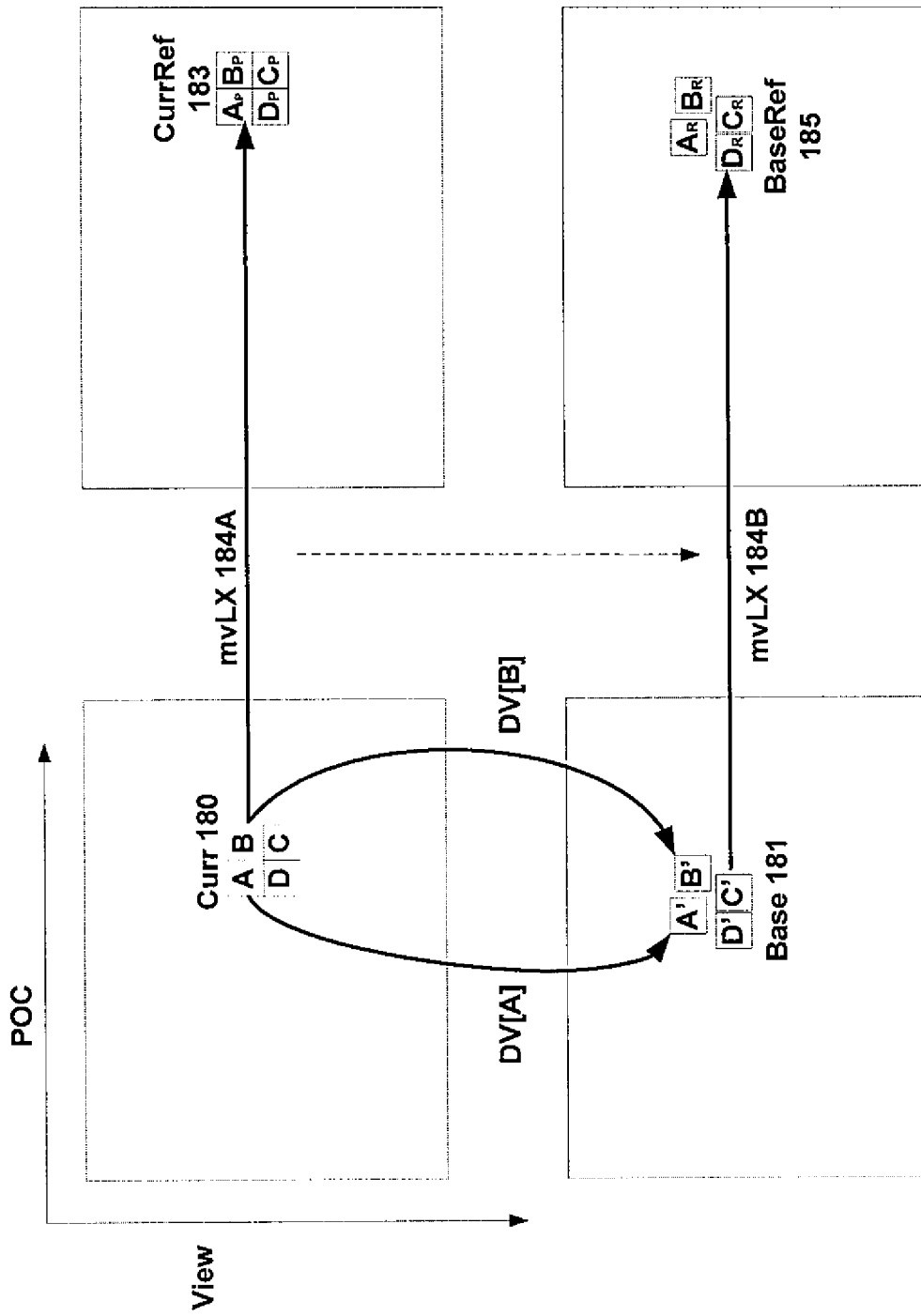
FIG. 8A shows an example prediction structure of block-level temporal ARP.

FIG. 8A shows an example prediction structure of block-level temporal ARP. In the example of FIG. 8A, Curr 180 represents a PU that is divided into four 8×8 blocks, labeled A-D in FIG. 8A. Base 181 represents four reference blocks (labeled A'-D') in a reference/base view derived by the disparity vectors of Curr 180. Block A' of Based 181 is identified using the disparity vector of block A (shown in FIG. 8A as DV[0]), and Block B' is identified using the disparity vector (shown in FIG. 8A as DV[1]). Although not explicitly shown in FIG. 8A, blocks C' and D' may likewise be identified using the disparity vectors of block C and D.

The derived motion vector (i.e., disparity vector in temporal ARP) may be updated for each 8×8 block. For temporal ARP, the default derivedMv (denoted by DV[i] for the i-th 8×8 block in FIG. 8A) is firstly set to be the DV from an NBDV process. When the block covering the center position of the i-th 8×8 block within CurrRef contains a disparity motion vector, DV[i] is updated to be that disparity motion vector. Thus, as shown in FIG. 8A, blocks A'-D' may be positioned differently, relative to one another, than blocks A-D are relative to one another. CurrRef 183 represents four blocks ($A_P$-$D_P$) in the same view as curr 180 derived by the temporal motion vector (shown as mvLX 184A in FIG. 8A) of Curr 180. BaseRef 185 represents the four blocks ($A_R$-$D_R$) in the same view as Base 181 derived by the temporal motion vector of the current block (mvLX 184B). In the example of FIG. 8A, mvLX 184A and mvLX 184B are intended to represent two different applications of the same motion vector. That is, mvLX 184A and mvLX 184B have the same x-component and y-component.

The residual predictor, in the example of FIG. 8A, is denoted as BaseRef-Base, where the subtraction operation applies to each pixel of the denoted pixel arrays. A weighting factor (w) is further multiplied to the residual predictor. Therefore, the final predictor for blocks A-D determined by video decoder 30 are denoted as CurrRef[$N_P$]+ w*(Base[N']-BaseRef[$N_R$]), with N corresponding to A-D.

Figure 8B:
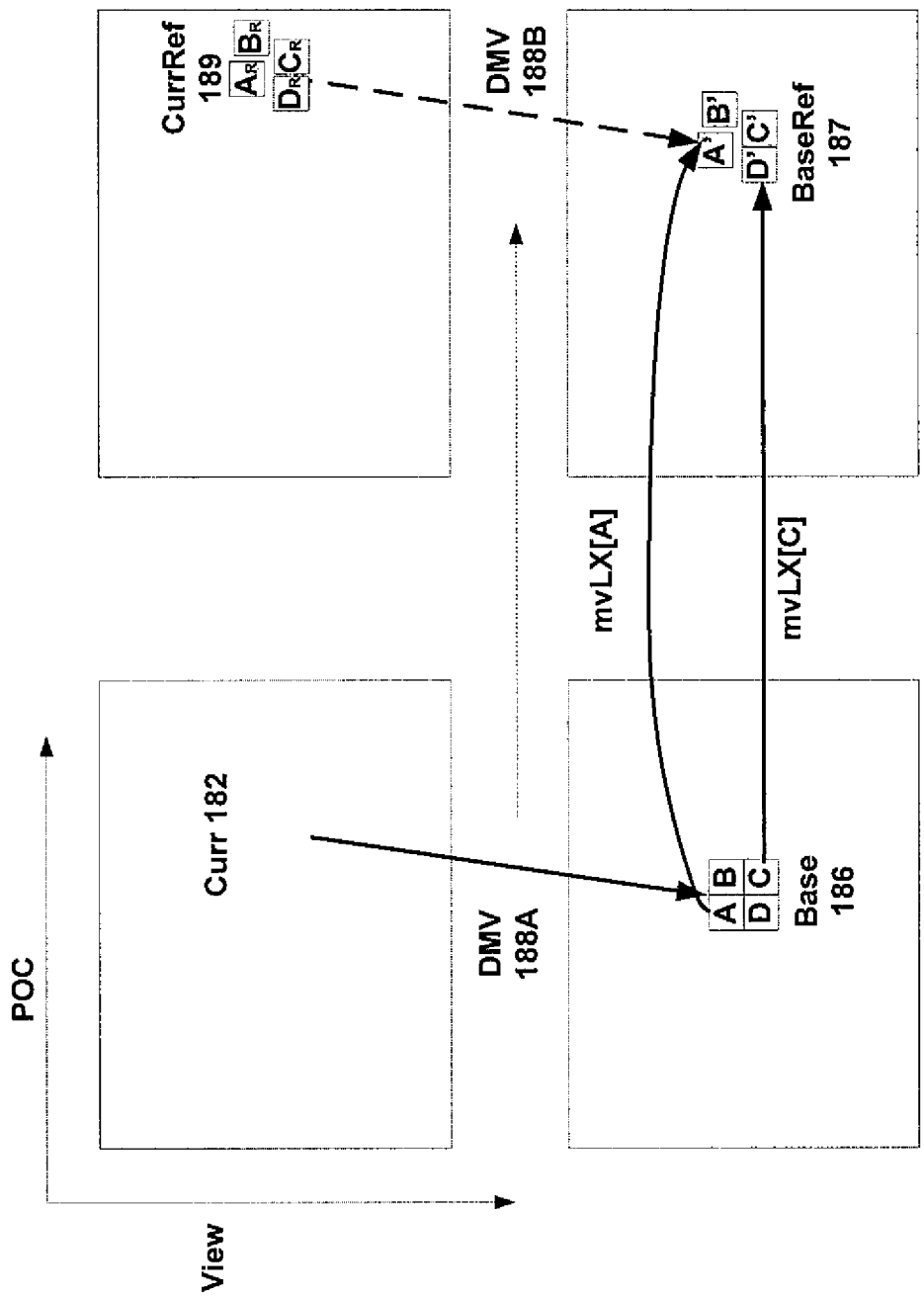
FIG. 8B shows an example prediction structure of block-level inter-view ARP.

FIG. 8B shows an example prediction structure of block-level inter-view ARP. In the example of FIG. 8B, video decoder 30 identifies three related blocks of current block 182. Base 186 represents the four reference blocks (A-D) in the reference view located by the disparity motion vector (DMV 188A) of current block 182. BaseRef 187 represents the four reference blocks (A'-D') of Base 186 in the reference view located by the temporal motion vector mvLX[N] and reference index, if available, contained by Base 186, where N corresponds to blocks A-D. For inter-view ARP, the default derivedMv (denoted by mvLX[i] for the i-th 8×8 block in FIG. 8B) may be set to the temporal motion vector associated with a block covering the center position of Base, as in current ARP. When the block covering the center position of the i-th 8×8 block within Base contains a temporal motion vector, mvLX[i] is updated to be that temporal motion vector. Thus, as shown in FIG. 8A, blocks A'-D' may be positioned differently, relative to one another, than blocks A-D are relative to one another.

CurrRef 189 represent four reference blocks ($A_R$-$D_R$) in the current view identified by reusing the temporal motion information from Base 186. Thus, for example, video decoder 30 locates $A_R$ using mvLX[A], locates $B_R$ using mvLX[B], and so on. With the three identified blocks, video decoder 30 may calculate the residual predictor of the residual signal of current PU as the difference between CurrRef−BaseRef. Which may be in different access units. Furthermore, the inter-view predictor may be multiplied by a weighting factor (w). Therefore, the final predictor of the current block determined by video decoder 30 is denoted as Base[N]+ w*(CurrRef[$N_R$]−BaseRef[N']).

As illustrated above, for both block-based temporal ARP and block-based inter-view ARP, only the block level (e.g., 8×8) motion information of the reference block located by current PU's motion vector is accessed to generate the final residual predictor.

Video decoder 30 may also perform sub-PU level inter-view motion prediction. In JCT3V-F0110, a sub-PU level inter-view motion prediction method is proposed to generate a new merging candidate. The new candidate is added to the merge candidate list. The new candidate, named sub-PU merging candidate, may be derived by video decoder 30 using the following method. In the following description, the size of a current PU is denoted by nPSW×nPSH, the signaled sub-PU size by N×N, and the final sub-PU size by subW×subH. Video decoder 30 first divides the current PU into one or multiple sub-PUs depending on the PU size and signaled sub-PU size.

sub$W$=max($N,nPSW$)!=$N$?$N$:$nPSW$;

sub$H$=max($N,nPSH$)!=$N$?$N$:$nPSH$;

Video decoder 30 secondly sets default motion vector tmvLX to (0, 0) and reference index refLX to −1 for each reference picture list (with X being 0 and 1). For each sub-PU in the raster scan order, video decoder 30 does the following:

add the DV from DoNBDV or NBDV process to the middle position of current sub-PU to obtain a reference sample location (xRefSub, yRefSub) by:

$x$RefSub=Clip3(0,PicWidthInSamples$L$−1,$xP$Sub+
    $nPSW$sub/2+(($mv$Disp[0]+2)>>2))

$y$RefSub=Clip3(0,PicHeightInSamples$L$−1,$yP$Sub+
    $nPSH$Sub/2+(($mv$Disp[1]+2)>>2))

a block in the reference view that covers (xRefSub, yRefSub) may be used as the reference block for current sub-PU.

For the identified reference block,
    if it is coded using temporal motion vectors, the following apply:
        The associated motion parameters can be used as candidate motion parameters for the current sub-PU.
        tmvLX and refLX are updated to the motion information of the current sub-PU.
        If current sub-PU is not the first one in the raster scan order, the motion information (tmvLX and refLX) is inherited by all the previous sub-PUs.
    Otherwise (the reference block is intra coded), the motion information of current sub-PU may be set to tmvLX and refLX.

Video decoder 30 may also be configured to perform sub-PU level ARP. When sub-PU level inter-view motion prediction is applied, a PU may contain multiple sub-PUs and each sub-PU has its own motion information, and ARP may be performed for each sub-PU. Different sub-PU block sizes may be applied, for example, 4×4, 8×8, and 16×16. The size of sub-PU block is present in view parameter set.

Figure 9:
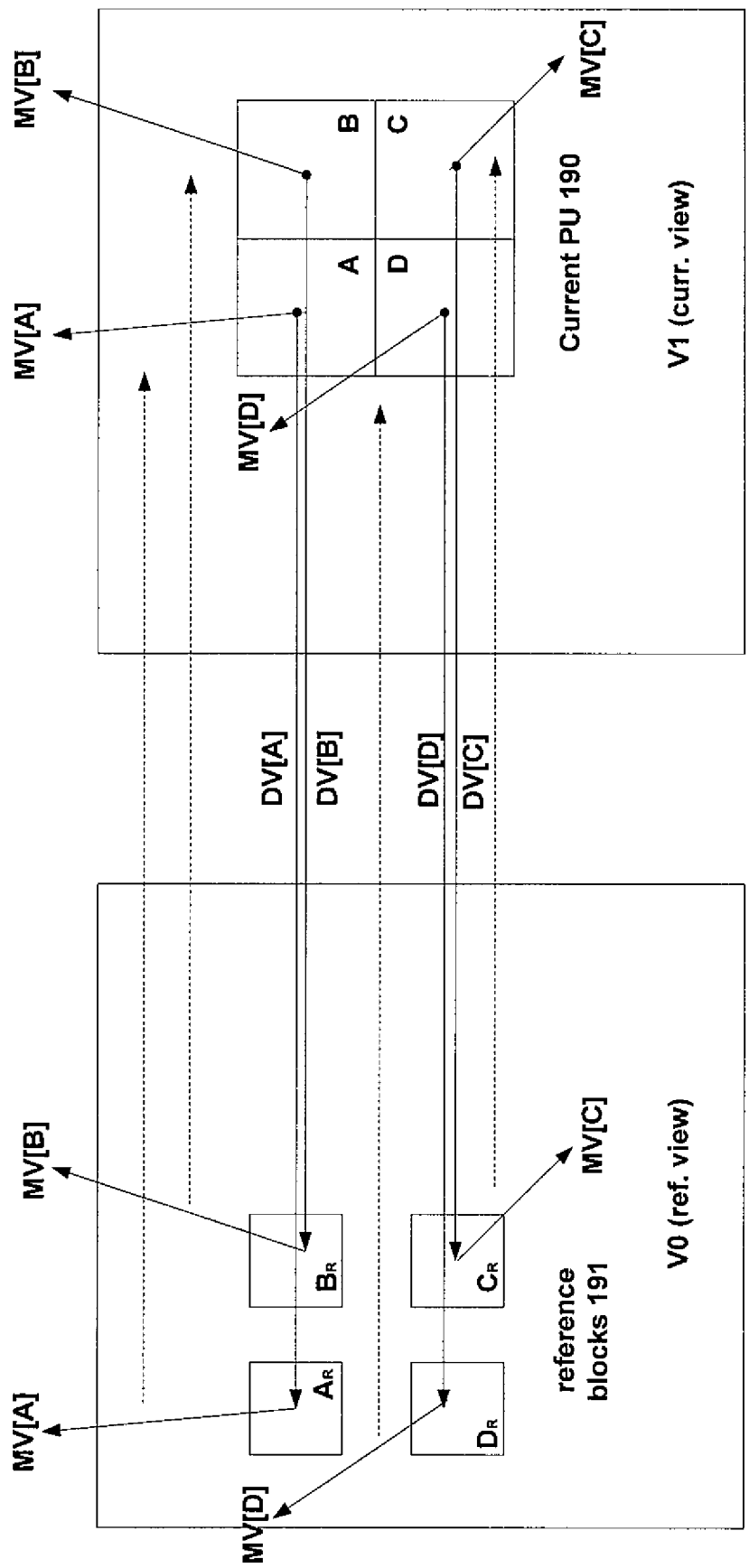
FIG. 9 shows an example prediction structure for sub-PU level inter-view motion prediction.

FIG. 9 shows an example of sub-PU level inter-view motion prediction. FIG. 9 shows a current view, referred to as V1, and a reference view, referred to as V0. Current PU 190 includes four sub-PUs A-D. Video decoder 30 may use disparity vectors of each of the four sub-PUs A-D to locate reference blocks 191, which includes four reference blocks $A_R$-$D_R$. The disparity vectors of sub-PUs A-D are shown in FIG. 9 as MV[i], where i corresponds to A-D. As each of the four sub-PUs has a unique disparity vector, the location of sub-PUs A-D relative to one another may differ than the location of reference blocks $A_R$-$D_R$ relative to one another. In sub-PU level interview motion prediction, video decoder 30 may use the motion vector of a reference block to predict a sub-PU. The motion vectors of reference blocks $A_R$-$D_R$ are shown in FIG. 9 as MV[i], where i corresponds to A-D. Thus, as one example, for sub-PU A, video decoder 30 may use DV[A] to locate reference block $A_R$, determine reference block $A_R$ was coded using MV[A], and use MV[A] to locate a predictive block for sub-PU A.

Figure 10A:
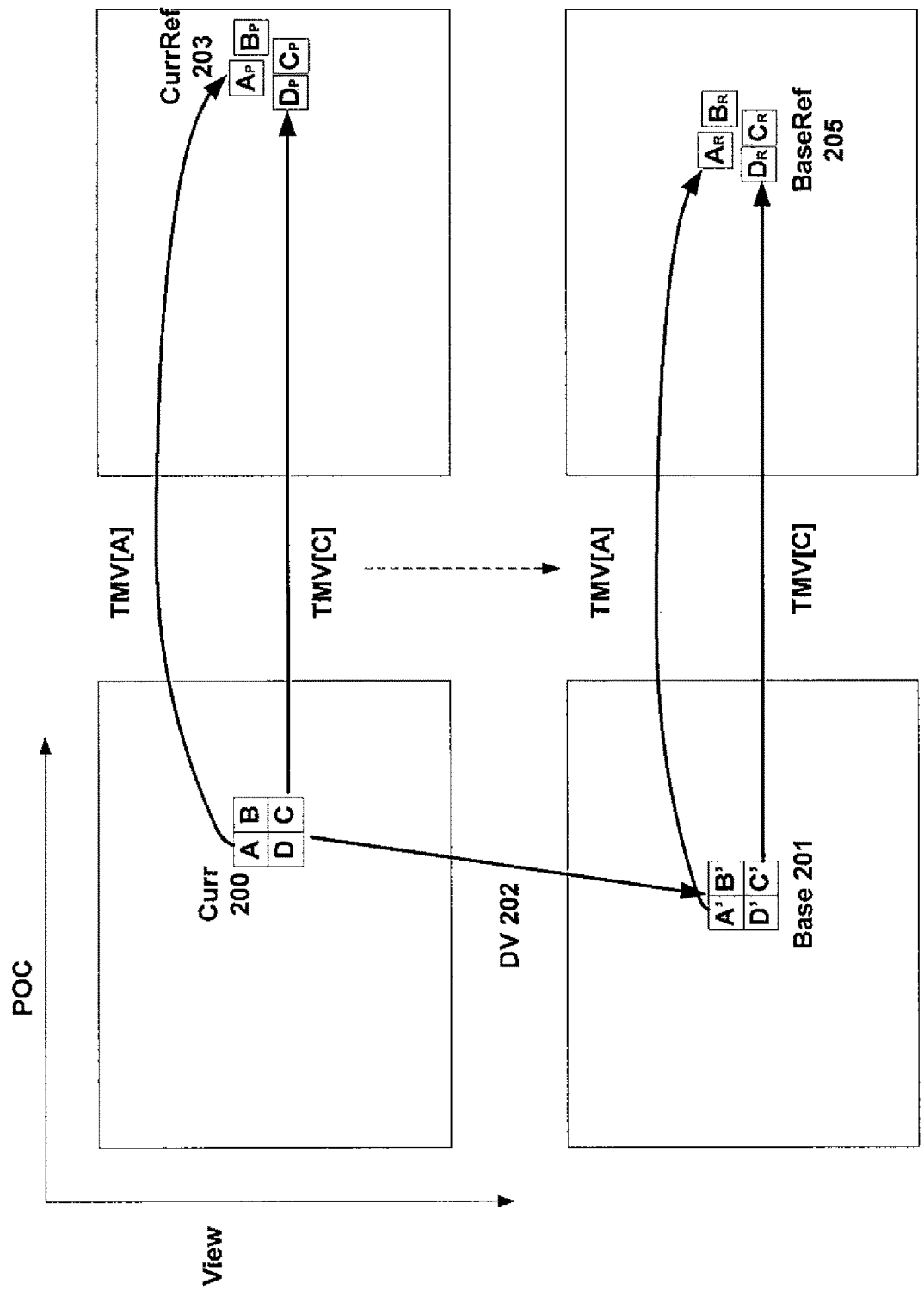
FIG. 10A shows an example prediction structure of sub-PU-level temporal ARP.

FIG. 10A shows an example prediction structure for sub-PU-level temporal ARP. In the example of FIG. 10A, a PU (Curr 200) is divided into four sub-PUs (labeled A-D in FIG. 10A). For sub-PU-level temporal ARP, video decoder 30 may use the same disparity vector (DV 202) for all sub-PUs of Curr 200 to identify the reference block (Base 201) in the reference view, which is generally the same as in PU-level ARP. Base 201 may be sub-divided into sub-reference blocks (A'-D' in FIG. 10A) that corresponds to sub-PUs A-D. Video decoder 30 may derive DV 202, for example, using an NBDV technique. Video decoder 30 uses motion information of each of sub-PUs A-D to identify temporal reference blocks ($A_P$-$D_P$ in FIG. 10A). The motion information of sub-PUs A-D is shown in FIG. 10A as TMV[i] for the i-th sub-PU, where i corresponds to A-D. TMV[A], for example, represents the temporal motion vector of sub-PU A, and TMV[C] represents the motion vector of sub-PU C. Although not explicitly shown in FIG. 10A, sub-PU B and sub-PU D would similarly have associated motion vectors, TMV[B] and TMV[D], respectively.

Video decoder 30 may reuse the motion information of sub-PUs A-D (i.e. TMV[i], for i=A-D) to locate the reference blocks of Base 201, shown as BaseRef 205 in FIG. 10A. BaseRef 205 includes four sub-blocks ($A_R$-$D_R$ in FIG. 10A). The residual predictor, in the example of FIG. 10A, may be denoted as BaseRef-Base, where the subtraction operation applies to each pixel of the denoted pixel arrays. A weighting factor (w) is further multiplied to the residual predictor. Therefore, the final predictor for blocks A-D determined by video decoder 30 may be denoted as CurrRef[$N_P$]+ w*(Base[N']−BaseRef[$N_R$], with N corresponding to A-D.

Figure 10B:
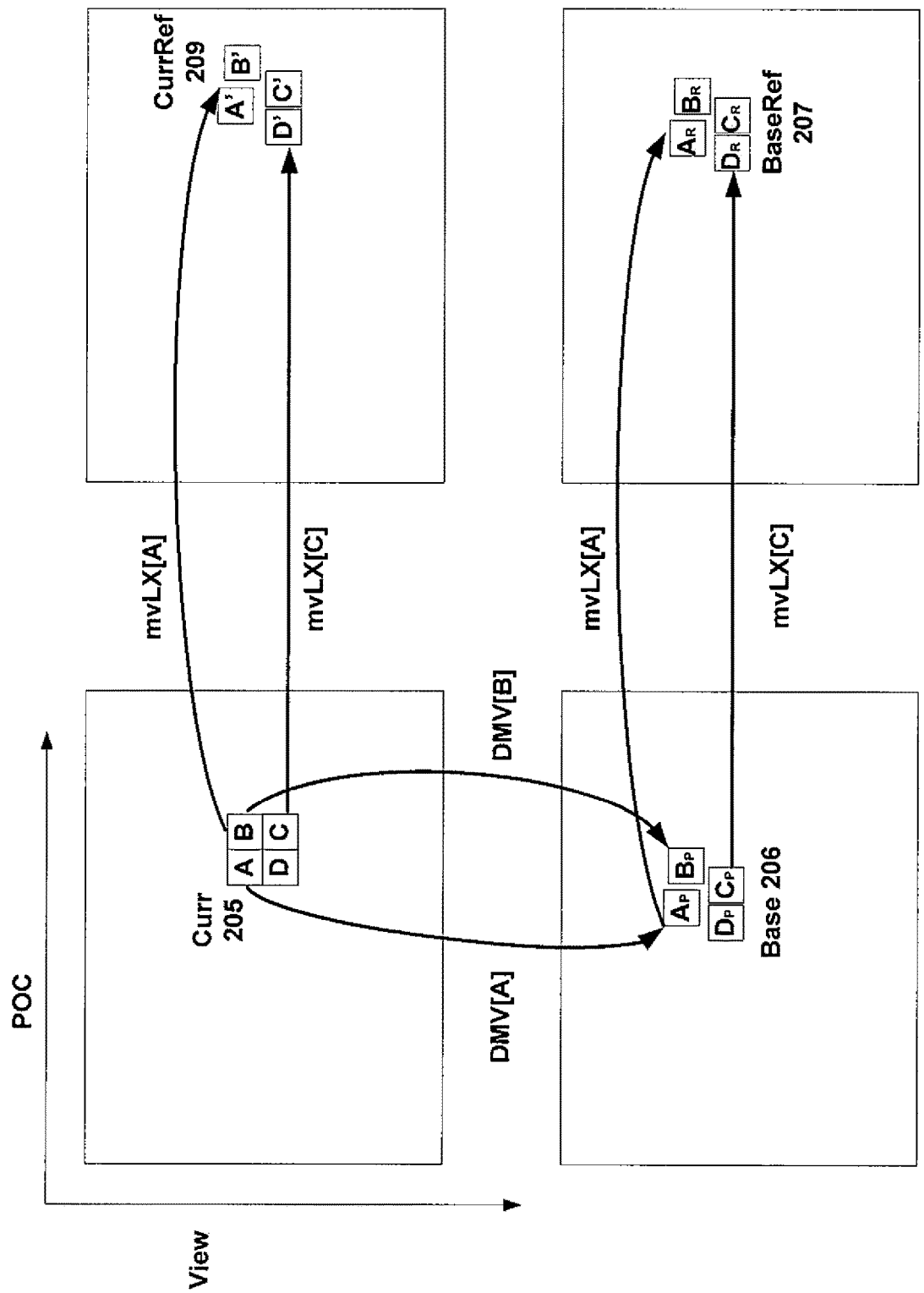
FIG. 10B shows an example prediction structure of sub-PU-level inter-view ARP.

FIG. 10B shows an example prediction structure of sub-PU-level inter-view ARP. In the example of FIG. 10B, a PU (Curr 200) is divided into four sub-PUs (labeled A-D in FIG. 10B). For Inter-view ARP, video decoder 30 uses a disparity motion vector of each of sub-PUs A-D to identify a reference block (Base 206) in a reference view. Base 206 includes four sub-reference blocks, labeled $A_P$-$D_P$ in FIG. 10B. The disparity motion vector of sub-PUs A-D is shown in FIG. 10B as DMV[i] for the i-th sub-PU, where i corresponds to A-D. DMV[A], for example, represents the disparity motion vector of sub-PU A, and DMV[B] represents the disparity motion vector of sub-PU B. Although not explicitly shown in FIG. 10B, sub-PU C and sub-PU D would similarly have associated disparity motion vectors, DMV[C] and DMV[D], respectively.

When the reference block (i.e. Base 206) contains a temporal motion vector (denoted by mvLX[i] FIG. 10B, where i corresponds to A-D), video decoder 30 uses the temporal motion vector to identify a temporal reference block for both the current sub-PU and its reference block in the reference view. For example, video decoder 30 uses mvLX[A] to locate a reference block for $A_P$, which is $A_R$ in FIG. 10B, as well as to locate a reference block of A, which is A' in FIG. 10B. Video decoder 30 may similarly use mvLX[C] to locate a reference block for $C_P$, which is $C_R$ in FIG. 10B, as well as to locate a reference block of C, which is C' in FIG. 10B. Although not explicitly shown in FIG. 10B, video decoder 30 may similarly locate reference blocks for C, $C_P$, D, and $D_P$.

With the identified blocks, video decoder 30 may calculate the residual predictor the current PU as the difference between CurrRef[N']−BaseRef[$N_R$], where N corresponds to A-D. Furthermore, the inter-view predictor may be multiplied by a weighting factor (w). Therefore, the final predictor of the current block determined by video decoder 30 may be denoted as Base[$N_P$]+ w*(CurrRef[N']−BaseRef[$N_R$]).

Some implementations of ARP have some potential problems. As an example, in some coding scenarios where a block is bi-predicted, four additional reference blocks may need to be assessed for a block (or PU, sub-PU). In a first example, illustrated by FIG. 11, when one block is bi-directionally predicted, and both prediction directions correspond to inter-view reference pictures, inter-view ARP is invoked twice and two additional reference blocks are accessed for each ARP.

Figure 11:
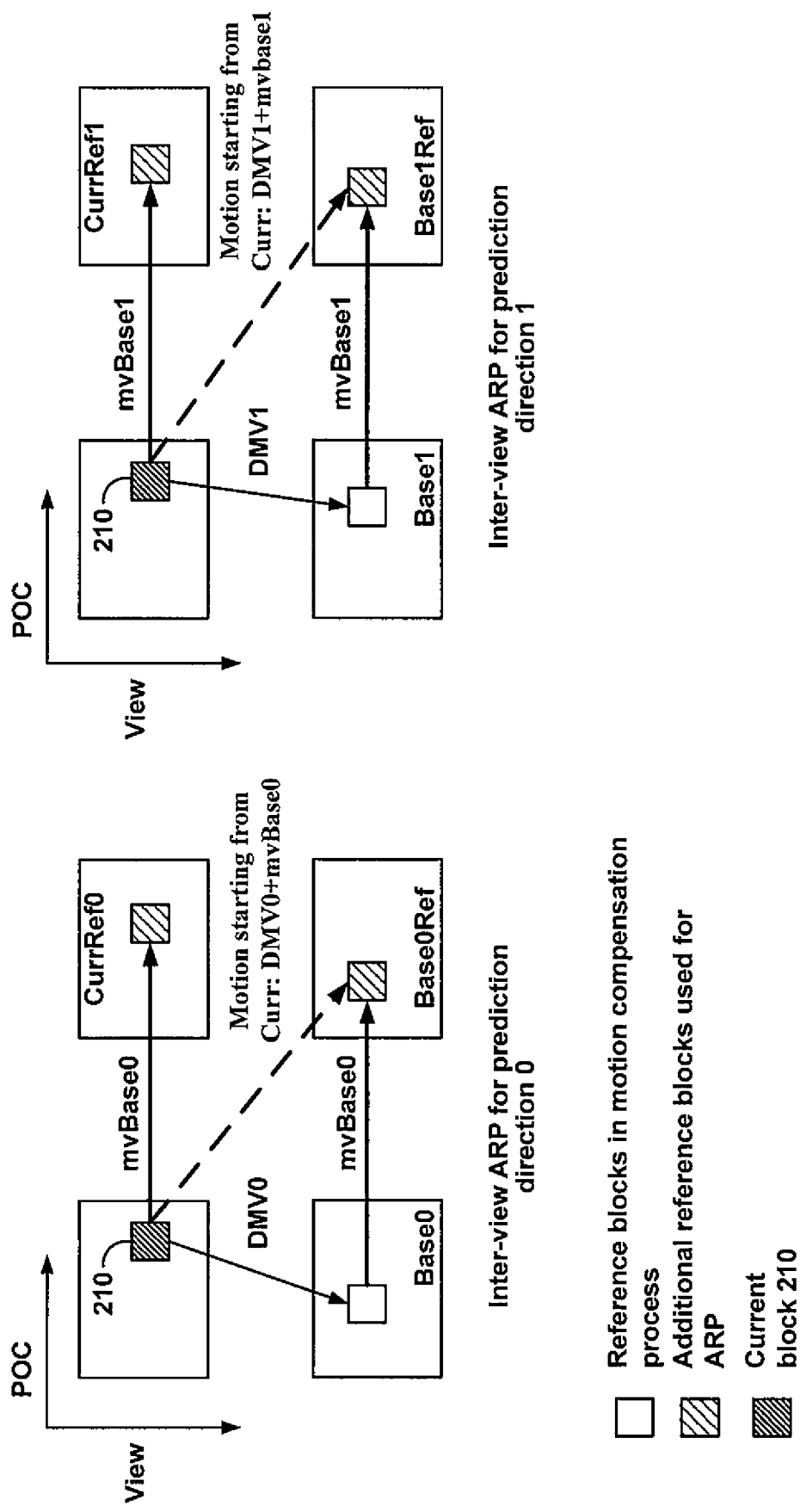
FIG. 11 shows an example of reference blocks access for bi-directional inter-view ARP in 3D-HEVC.

FIG. 11 shows an example of reference blocks accessed by video decoder 30 for bi-directional inter-view ARP in 3D-HEVC. In the example of FIG. 11, the disparity motion vector of prediction direction X is denoted by DMVX, where X=0 or 1. For prediction direction X, a reference block in the current view (CurrRefX in FIG. 11) is identified by motion information (mvBaseX in FIG. 11) associated with the reference block in reference view (BaseX in FIG. 11), and a reference block of BaseX in reference view (BaseXRef in FIG. 11) identified by DMVX+mvBaseX are assessed.

Figure 12:
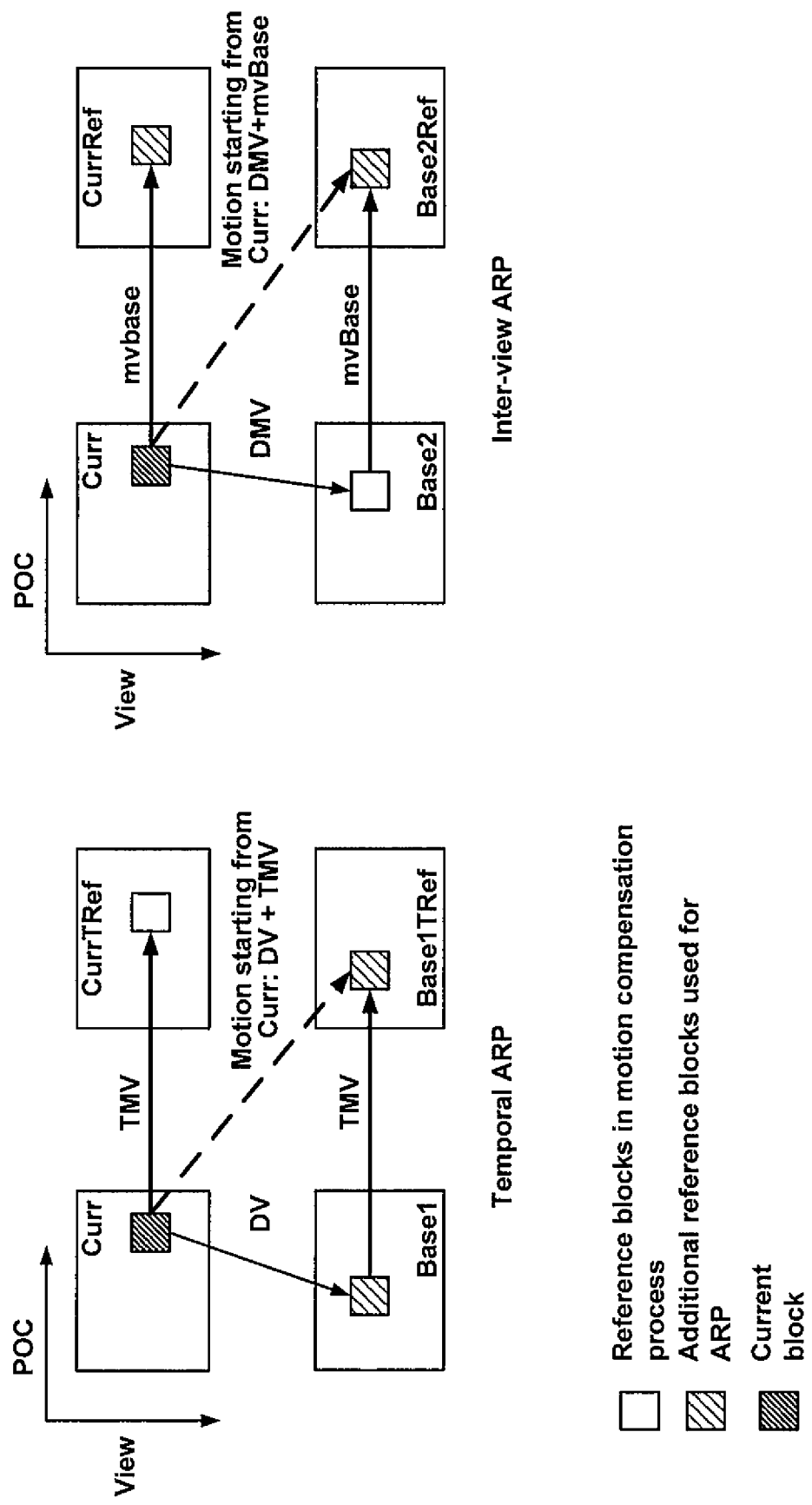
FIG. 12 shows an example reference blocks access for temporal ARP and inter-view ARP in 3D-HEVC.

FIG. 12 shows an example of reference blocks accessed by video decoder 30 for temporal ARP and inter-view ARP in 3D-HEVC. In a second example, illustrated by FIG. 12, when one block is bi-directionally predicted, and one prediction direction corresponds to a temporal reference picture (and the temporal motion vector is TMV) and the other prediction direction corresponds to an inter-view reference picture (and the disparity motion vector is DMV), both temporal ARP and inter-view ARP are invoked and two additional reference blocks are accessed for each ARP as shown in FIG. 12.

In the temporal ARP, a reference block in reference view (Base1 in FIG. 12) identified by DV derived using an NBDV process, and a reference block of Base1 in reference view (Base1TRef in FIG. 12) identified by DV+TMV are assessed. In the inter-view ARP, a reference block in current view (CurrRef in FIG. 12) identified by motion information (mvBase in FIG. 12) associated with the reference block in reference view (Base2 in FIG. 12), and a reference block of Base2 in reference view (Base2Ref in FIG. 12) identified by DMV+mvBase are assessed.

According to some known techniques, the process of FIG. 12 is simplified to reduce the additionally assessed reference blocks. For example, a DMV may be used instead of a DV derived using an NBDV process to identify the reference block in the reference view (i.e. Base1 in FIG. 12) for the temporal ARP. In this way, the block Base1 is the same as the block Base2 in FIG. 12 and no additional assessments of Base1 is required. Therefore, additionally assessed reference blocks in the first example are reduced from four to three.

However, in the first example of the above problem, there are still four additional reference blocks to assess. This makes the worst case of number of blocks needed to access for an ARP predicted block increased from three to four.

This disclosure potentially provides solutions to some of the above-mentioned problems in ARP to reduce the additionally assessed reference blocks. As one example, it is proposed that when a first block is coded with ARP (including sub-PU level ARP) and is bi-directionally predicted and both prediction directions have reference pictures being inter-view reference pictures, video decoder 30 may use one single temporal motion vector to identify the reference block of the current block in the current view for (inter-view ARP of) both prediction directions. In other words, both temporal motion vectors (e.g. mvBase0 and mvBase1 as shown in FIG. 11) are set to be mvBase. Additionally, only one reference block of the current block is determined, as opposed to both CurrRef0 and CurrRef1 in FIG. 12. In this case, only one reference block (denoted by CurrRef in FIG. 13), instead of two reference blocks, in a current view are assessed, as shown in FIG. 13.

Figure 13:
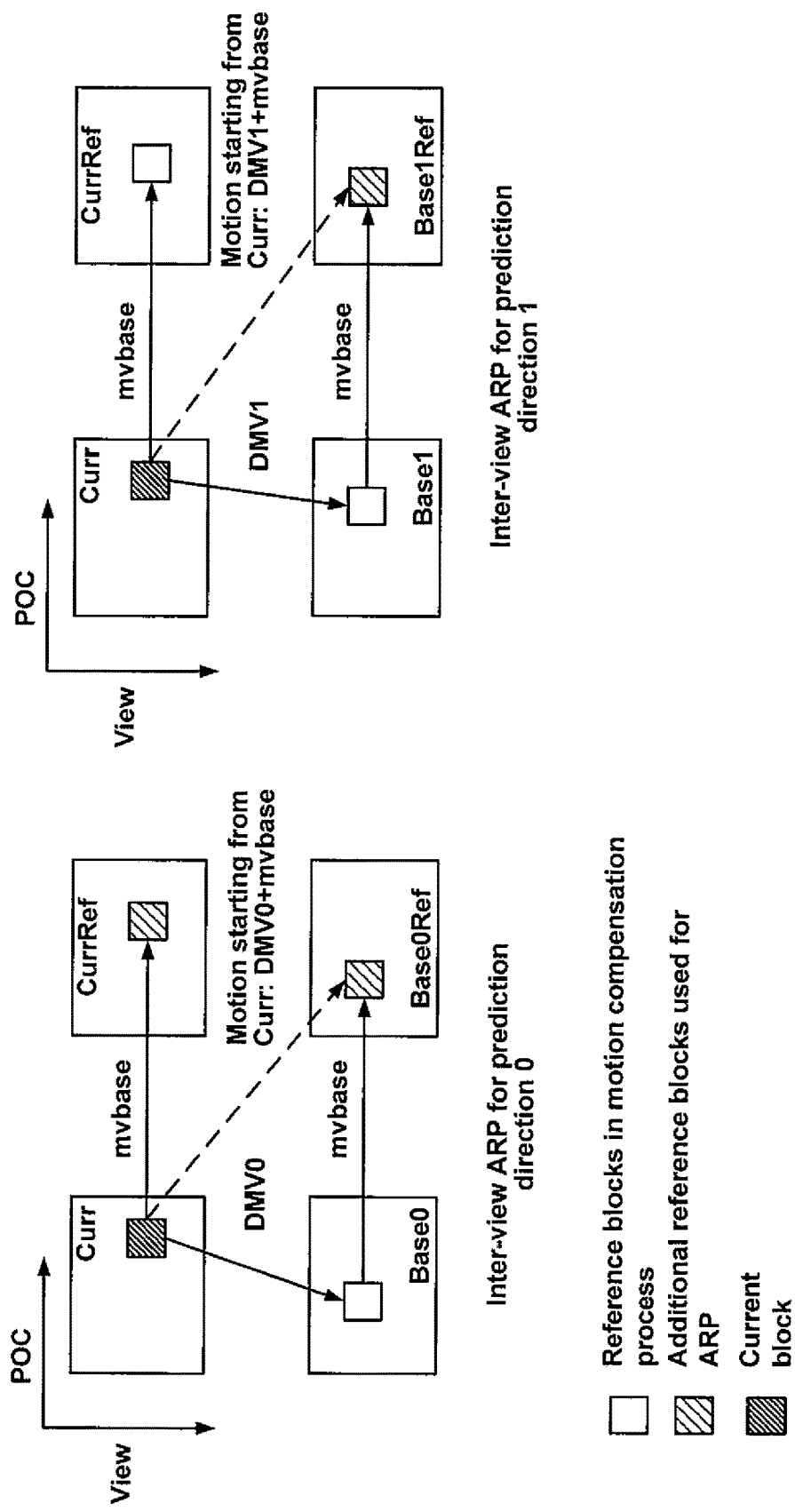
FIG. 13 shows an example of a single temporal motion vector used in bi-directional inter-view ARP.
Figure 14:
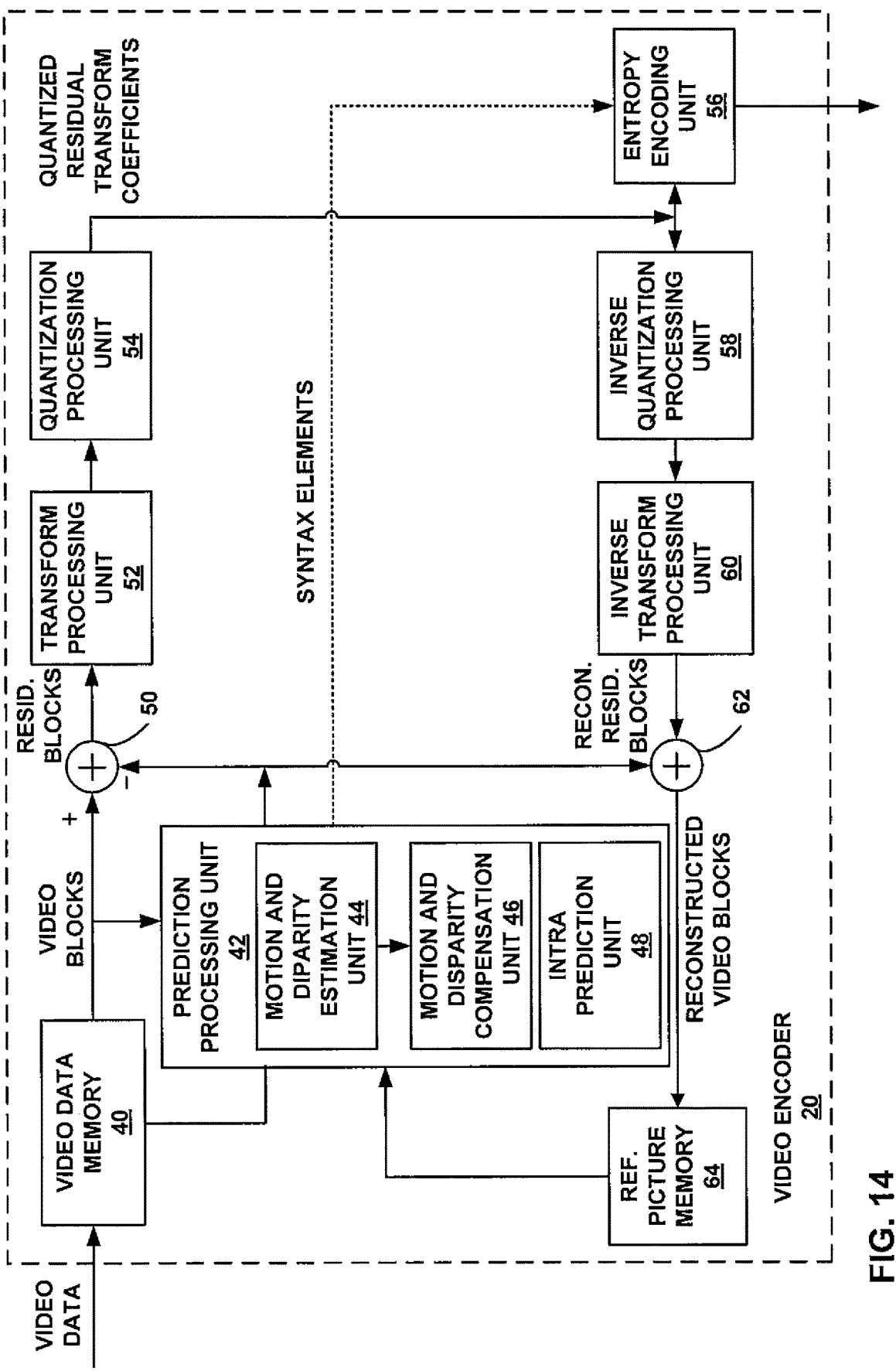
FIG. 14 shows an example of a video encoder configured to implement techniques described in this disclosure.

FIG. 13 shows an example of how one single temporal motion vector may be used in bi-directional inter-view ARP.

In one example, the single temporal motion vector (mvBase) may be set to be the temporal motion vector associated with the reference block in the reference view for prediction direction 0 (e.g. mvBase0). In addition, when mvBase0 is unavailable, ARP may be disabled for the first block. Alternatively, when mvBase0 is unavailable, the single motion vector (mvBase) may be set to be the zero motion vector.

In the example of FIG. 13, video decoder 30 may perform inter-view ARP for two prediction directions. For prediction direction 0, video decoder 30 determines a first disparity motion vector (DMV0) for Curr and a second disparity motion vector (DMV1) for Curr. Video decoder 30 uses DMV0 to locate a first corresponding block (Base0) and uses DMV1 to locate a second corresponding block (Base1). From the motion vectors of Base0 and Base1, video decoder 30 determine a motion vector (mvBase) to use for ARP. The various processes video decoder 30 may use to determine mvBase will be explained in greater detail below. Using mvBase, video decoder 30 determines a reference block (CurrRef) of the current block in a different picture in the same view as Curr. Using mvBase, video decoder 30 also determines a reference block for Base 0 (Base0Ref) and a reference block for Base1 (Base1Ref). Using the identified blocks, video decoder 30 generates two predictors. The first predictor is Base0+w*(CurrRef−Base0Ref), and the second predictor is Base1+ w*(CurrRef−Base1Ref).

Video decoder 30 may determine mvBase to be the temporal motion vector associated with Base0 if a motion vector for Base0 is available, or may determine mvBase to be the temporal motion vector associated with Base1 if a motion vector for Base1 is available. If video decoder 30 is configured to use the motion vector of Base0 as mvBase, then ARP may be disabled for the first block when a motion vector for Base0 is unavailable. Alternatively, if video decoder 30 is configured to use the motion vector of Base0 as mvBase, then mvBase may be set to be the zero motion vector when a motion vector of Base0 is unavailable. Similarly, if video decoder 30 is configured to use the motion vector of Base1 as mvBase, then ARP may be disabled for the first block when a motion vector for Base1 is unavailable. Alternatively, if video decoder 30 is configured to use the motion vector of Base1 as mvBase, then mvBase may be set to be the zero motion vector when a motion vector of Base1 is unavailable.

In another example, video decoder 30 may set mvBase to be the temporal motion vector of Base1 if a motion vector for Base0 is unavailable, or may set mvBase to be the temporal motion vector of Base0 if a motion vector for Base1 is unavailable. Video decoder may set mvBase to be a zero motion vector if a motion vector for Base1 is unavailable and if a motion vector for Base0 is unavailable. Video decoder may disable ARP if a motion vector for Base1 is unavailable and if a motion vector for Base0 is unavailable. In another example, video decoder 30 may disable inter-view ARP for prediction direction X, when the temporal motion vector associated with reference block in reference view is not available for prediction direction X.

According to another technique of this disclosure, it is proposed that when one block is coded with ARP (including sub-PU level ARP) and is bi-directionally predicted, video decoder 30 applies chroma ARP only for one prediction direction (prediction direction X) and disables ARP for the other prediction direction (prediction direction 1−X), where X may be either 0 or 1. Luma ARP (including sub-PU level ARP) may be kept unchanged. In one example, X is equal to 0. Video decoder 30 may use this technique or jointly or independently of the single motion vector technique described above.

According to another technique of this disclosure, it is proposed that when one block is coded with ARP, in addition ARP for chroma components is applied only when the block size is in a certain range, meaning the width and height of the current block is in a certain range. In one example, if a block size is equal to 8×8, ARP for chroma components may be disabled. In another example, if a block size is smaller than 32×32, ARP for chroma components may be disabled. In another example, sub-PU level ARP for chroma may be disabled for any sub-PU with a size equal N×N, but ARP for chroma is enabled for a PU with a size equal to N×N. Here, N can be 8, 16, 32, or 64. In another example, sub-PU level ARP for chroma may be disabled for any sub-PU with a size equal N×N, but ARP for chroma is enabled for a PU with a size equal to M×M. Here, M can be smaller than N and both of them can 8, 16, 32, or 64 as long as M is smaller than N.

It is contemplated that the various techniques described in this disclosure may be implemented either independently or jointly. For example, the single motion vector techniques described above may be implemented in conjunction with the chroma ARP techniques described above. Similarly, it is also contemplated that the block-size based chroma ARP techniques described above may be implemented in conjunction with the single motion vector techniques described above. Also, it is contemplated that the various techniques described in this disclosure may be applied to any of PU-level ARP, sub-PU level ARP, and block-level ARP.

Figure 15:
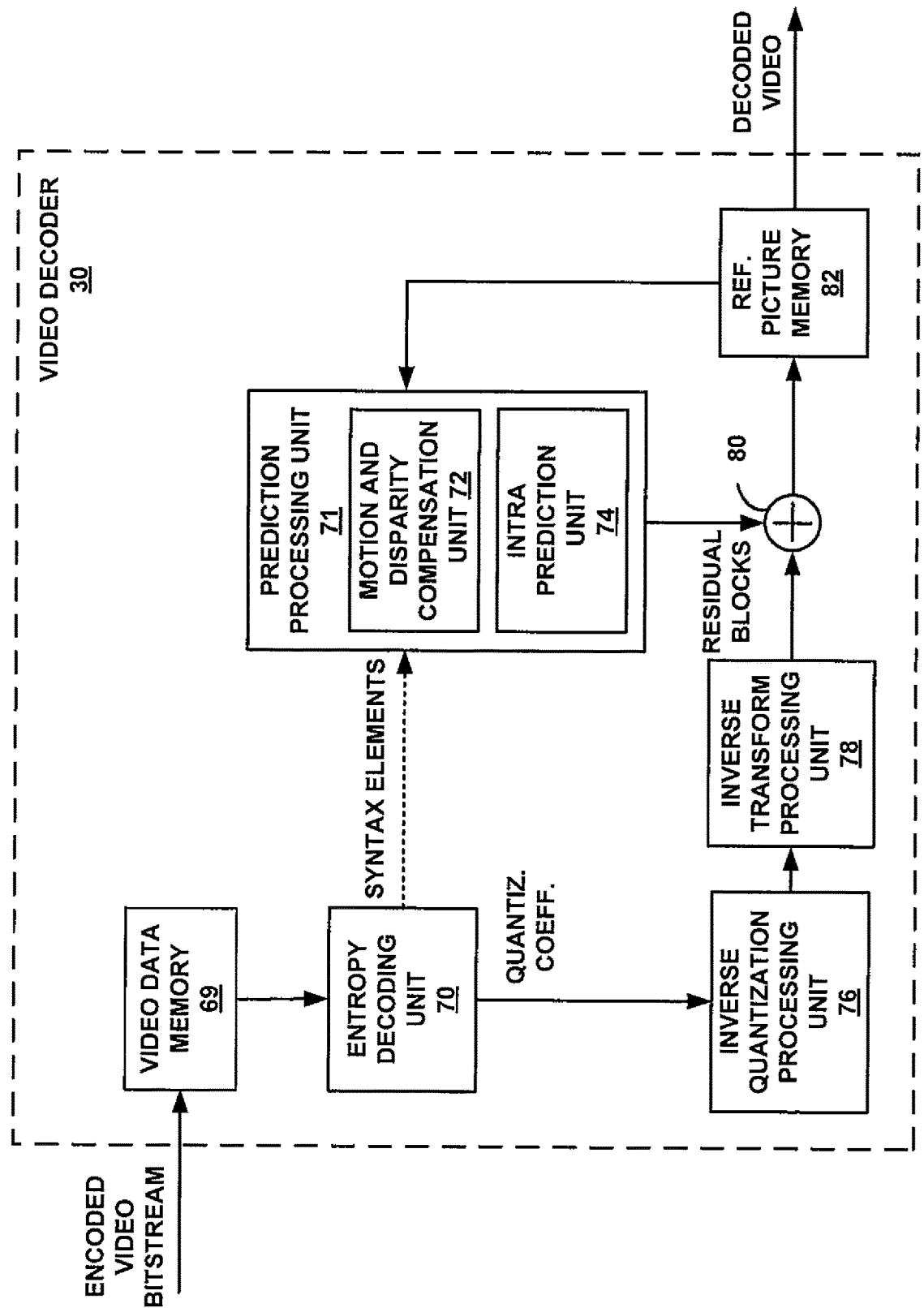
FIG. 15 shows an example of a video decoder configured to implement techniques described in this disclosure.

FIG. 15 is a block diagram illustrating an example of a video encoder that may implement the ARP techniques described in this disclosure. For example, FIG. 15 illustrates video encoder 20 which may represent either a 3D-AVC compliant or a 3D-HEVC compliant video encoder. Video encoder 20 will be described using certain HEVC terminology such as PUs, TUs, and CUs, but it should be understood that the techniques described with reference to video encoder 20 may also be performed with video coded according to the H.264 standard.

Video encoder 20 may perform intra- and inter-coding of video blocks within video slices. For example, video encoder 20 may perform inter-prediction encoding or intra-prediction encoding. Intra-coding relies on spatial prediction to reduce or remove spatial redundancy in video within a given video frame or picture. Inter-coding relies on temporal prediction or inter-view prediction to reduce or remove temporal redundancy within adjacent frames or pictures of a video sequence or redundancy between pictures in different views. Intra-mode (I mode) may refer to any of several spatial based compression modes. Inter-modes, such as uni-directional prediction (P mode) or bi-prediction (B mode), may refer to any of several temporal-based compression modes.

In the example of FIG. 15, video encoder 20 includes video data memory 40, prediction processing unit 42, reference picture memory 64, summer 50, transform processing unit 52, quantization processing unit 54, and entropy encoding unit 56. Prediction processing unit 42 includes motion and disparity estimation unit 44, motion and disparity compensation unit 46, and intra-prediction unit 48. For video block reconstruction, video encoder 20 also includes inverse quantization processing unit 58, inverse transform processing unit 60, and summer 62. A deblocking filter (not shown in FIG. 15) may also be included to filter block boundaries to remove blockiness artifacts from reconstructed video. If desired, the deblocking filter would typically filter the output of summer 62. Additional loop filters (in loop or post loop) may also be used in addition to the deblocking filter.

Video data memory 40 may store video data to be encoded by the components of video encoder 20. The video data stored in video data memory 40 may be obtained, for example, from video source 18. Reference picture memory 64 is one example of a decoding picture buffer (DPB that stores reference video data for use in encoding video data by video encoder 20 (e.g., in intra- or inter-coding modes, also referred to as intra- or inter-prediction coding modes). Video data memory 40 and reference picture memory 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 40 and reference picture memory 64 may be provided by the same memory device or separate memory devices. In various examples, video data memory 40 may be on-chip with other components of video encoder 20, or off-chip relative to those components.

Video encoder 20 receives video data, and a partitioning unit (not shown) partitions the data into video blocks. This partitioning may also include partitioning into slices, tiles, or other larger units, as wells as video block partitioning (e.g., macroblock partitions and sub-blocks of partitions). Video encoder 20 generally illustrates the components that encode video blocks within a video slice to be encoded. The slice may be divided into multiple video blocks (and possibly into sets of video blocks referred to as tiles). Prediction processing unit 42 may select one of a plurality of possible coding modes, such as one of a plurality of intra coding modes (intra-prediction coding modes) or one of a plurality of inter coding modes (inter-prediction coding modes), for the current video block based on error results (e.g., coding rate and the level of distortion). Prediction processing unit 42 may provide the resulting intra- or inter-coded block to summer 50 to generate residual block data and to summer 62 to reconstruct the encoded block for use as a reference picture.

Intra prediction unit 48 within prediction processing unit 42 may perform intra-predictive coding of the current video block relative to one or more neighboring blocks in the same frame or slice as the current block to be coded to provide spatial compression. Motion and disparity estimation unit 44 and motion and disparity compensation unit 46 within prediction processing unit 42 perform inter-predictive coding of the current video block relative to one or more predictive blocks in one or more reference pictures to provide temporal compression.

Motion and disparity estimation unit 44 may be configured to determine the inter-prediction mode for a video slice according to a predetermined pattern for a video sequence. The predetermined pattern may designate video slices in the sequence as P slices or B slices. Motion and disparity estimation unit 44 and motion and disparity compensation unit 46 may be highly integrated, but are illustrated separately for conceptual purposes. Motion estimation, performed by motion and disparity estimation unit 44, is the process of generating motion vectors, which estimate motion for video blocks. A motion vector, for example, may indicate the displacement of a video block within a current video frame or picture relative to a predictive block within a reference picture.

A predictive block is a block that is found to closely match the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion and disparity estimation unit 44 may perform a motion search relative to the full pixel positions and fractional pixel positions and output a motion vector with fractional pixel precision.

Motion and disparity estimation unit 44 calculates a motion vector for a video block in an inter-coded (inter-prediction coded) slice by comparing the position of the video block to the position of a predictive block of a reference picture. The reference picture may be selected from a first reference picture list (RefPicList0) or a second reference picture list (RefPicList1), each of which identify one or more reference pictures stored in reference picture memory 64. Motion and disparity estimation unit 44 sends the calculated motion vector to entropy encoding unit 56 and motion and disparity compensation unit 46.

Motion compensation, performed by motion and disparity compensation unit 46, may involve fetching or generating the predictive block based on the motion vector determined by motion estimation, possibly performing interpolations to sub-pixel precision. Upon receiving the motion vector for the current video block, motion and disparity compensation unit 46 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion and disparity compensation unit 46 may also generate syntax elements associated with the video blocks and the video slice for use by video decoder 30 in decoding the video blocks of the video slice.

Intra-prediction unit 48 may intra-predict a current block, as an alternative to the inter-prediction performed by motion and disparity estimation unit 44 and motion and disparity compensation unit 46, as described above. In particular, intra-prediction unit 48 may determine an intra-prediction mode to use to encode a current block. In some examples, intra-prediction unit 48 may encode a current block using various intra-prediction modes, e.g., during separate encoding passes, and intra-prediction unit 48 (or a mode select unit, in some examples) may select an appropriate intra-prediction mode to use from the tested modes. For example, intra-prediction unit 48 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 48 may calculate ratios from the distortions and rates for the various encoded blocks to determine which intra-prediction mode exhibits the best rate-distortion value for the block.

In any case, after selecting an intra-prediction mode for a block, intra-prediction unit 48 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 42 generates the predictive block for the current video block via either inter-prediction or intra-prediction, video encoder 20 forms a residual video block by subtracting the predictive block from the current video block. The residual video data in the residual block may be applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization processing unit 54. Quantization processing unit 54 quantizes the transform coefficients to further reduce bit rate. The quantization process may reduce the bit depth associated with some or all of the coefficients. The degree of quantization may be modified by adjusting a quantization parameter. In some examples, quantization processing unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization processing unit 58 and inverse transform processing unit 60 apply inverse quantization and inverse transformation, respectively, to reconstruct the residual block in the pixel domain for later use as a reference block of a reference picture. Motion and disparity compensation unit 46 may calculate a reference block by adding the residual block to a predictive block of one of the reference pictures within one of the reference picture lists. Motion and disparity compensation unit 46 may also apply one or more interpolation filters to the reconstructed residual block to calculate sub-integer pixel values for use in motion estimation. Summer 62 adds the reconstructed residual block to the motion compensated prediction block produced by motion and disparity compensation unit 46 to produce a reference block for storage in reference picture memory 64. The reference block may be used by motion and disparity estimation unit 44 and motion and disparity compensation unit 46 as a reference block to inter-predict a block in a subsequent video frame or picture.

In this manner, video encoder 20 is an example of a video encoder that may be configured to implement one or more example techniques described in this disclosure. For example, video data memory 40 stores video data. The video data may include a texture video component of a dependent view and a depth view component that corresponds to the texture view component, each of which video encoder 20 is to encode in a 3D-AVC compliant or 3D-HEVC compliant video coding process.

In the techniques described in this disclosure, video encoder 20 may include one or more processors that are configured to encode, in a 3D-AVC compliant or 3D-HEVC compliant video coding process, a texture view component of a dependent view of the video data. As described above, each view in a 3D-AVC includes a texture view component and depth view component. There is one base view and one or more enhancement or dependent views in 3D-AVC, where texture view components of the one or more enhancement or dependent views may be inter-view predicted.

To encode the texture view component, video encoder 20 may be configured to evaluate motion information of one or more neighboring blocks of a current block in the texture view component to determine whether at least one neighboring block is inter-view predicted with a disparity motion vector that refers to an inter-view reference picture in a view other than the dependent view. Video encoder 20 may derive a disparity vector for the current block based on the disparity motion vector for one of the neighboring blocks. For texture-first coding, video encoder 20 may encode a depth view component, of the video data, that corresponds to the texture view component subsequent to encoding the texture view component.

In some examples, prediction processing unit 42 of video encoder 20 may be one example of a processor configured to implement the examples described in this disclosure. In some examples, a unit (e.g., one or more processors) other than prediction processing unit 42 may implement the examples described above. In some examples, prediction processing unit 42 in conjunction with one or more other units of video encoder 20 may implement the examples described above. In some examples, a processor of video encoder 20 (not shown in FIG. 15) may, alone or in conjunction with other processors of video encoder 20, implement the examples described above.

Figure 16:
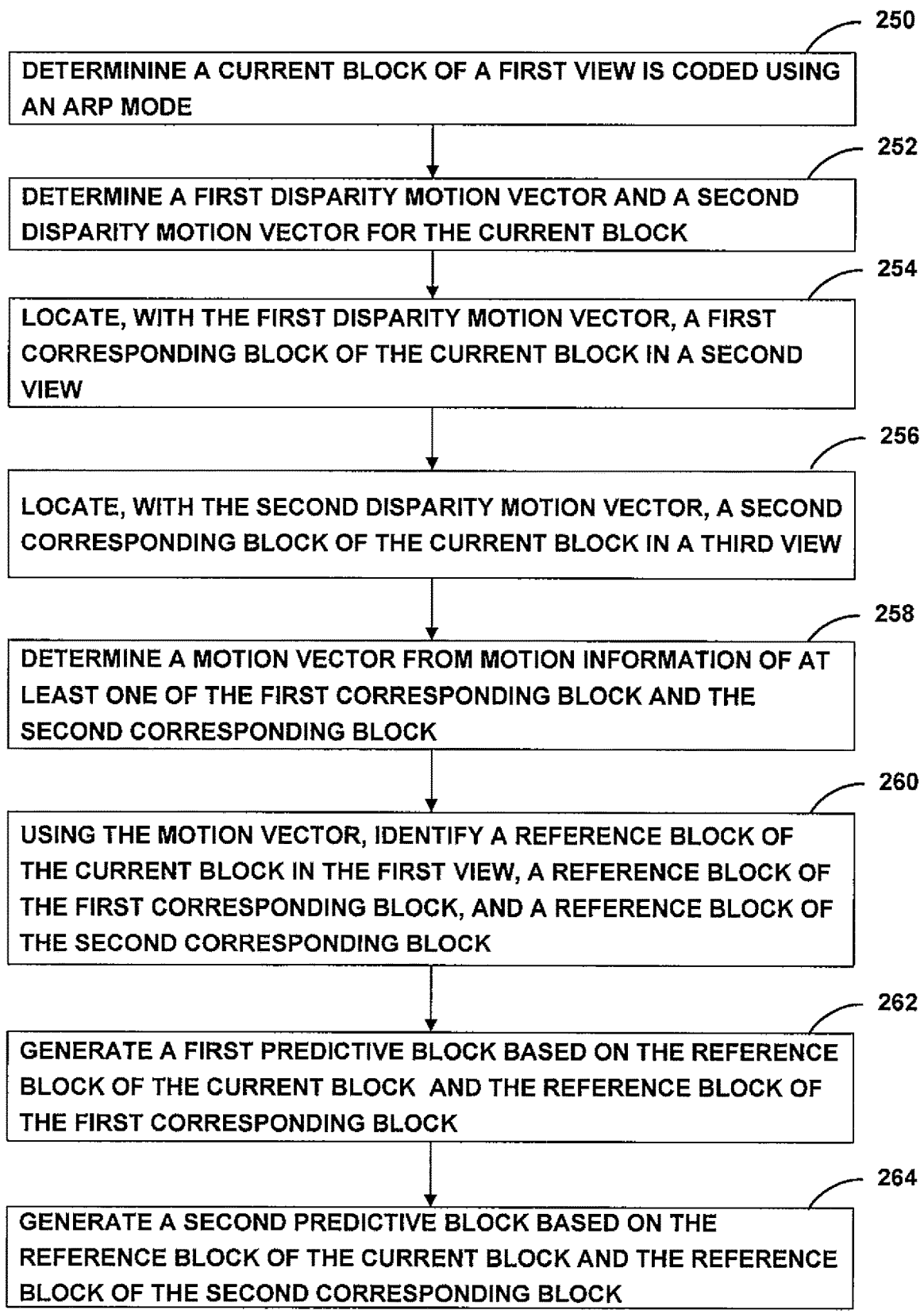
FIG. 16 shows an example method of predicting a video block according to the techniques of this disclosure.

FIG. 16 is a block diagram illustrating an example of a video decoder that may implement the ARP techniques described in this disclosure. FIG. 16 is a block diagram illustrating an example of a video decoder that may implement the techniques described in this disclosure. For example, FIG. 16 illustrates video decoder 30 which may represent either a 3D-AVC compliant or a 3D-HEVC compliant video decoder. Video decoder 30 will be described using certain HEVC terminology such as PUs, TUs, and CUs, but it should be understood that the techniques described with reference to video decoder 30 may also be performed with video coded according to the H.264 standard.

Video decoder 30 may perform inter-prediction decoding or intra-prediction decoding. FIG. 16 illustrates video decoder 30. In the example of FIG. 16, video decoder 30 includes video data memory 69, entropy decoding unit 70, prediction processing unit 71, inverse quantization processing unit 76, inverse transform processing unit 78, summer 80, and reference picture memory 82. Prediction processing unit 71 includes motion and disparity compensation unit 72 and intra-prediction unit 74. Video decoder 30 may, in some examples, perform a decoding pass generally reciprocal to the encoding pass described with respect to video encoder 20 from FIG. 15.

Video data memory 69 may store video data, such as an encoded video bitstream, to be decoded by the components of video decoder 30. The video data stored in video data memory 69 may be obtained, for example, from storage device 34, from a local video source, such as a camera, via wired or wireless network communication of video data, or by accessing physical data storage media. Video data memory 69 may form a coded picture buffer (CPB) that stores encoded video data from an encoded video bitstream.

Reference picture memory 82 is one example of a decoded picture buffer (DPB) that stores reference video data for use in decoding video data by video decoder 30 (e.g., in intra- or inter-coding modes). Video data memory 69 and reference picture memory 82 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 69 and reference picture memory 82 may be provided by the same memory device or separate memory devices. In various examples, video data memory 69 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors, and other syntax elements. Entropy decoding unit 70 forwards the motion vectors and other syntax elements to prediction processing unit 71. Video decoder 30 may receive the syntax elements at the video slice level and/or the video block level.

When the video slice is coded as an intra-coded (I) slice, intra-prediction unit 74 of prediction processing unit 71 may generate prediction data for a video block of the current video slice based on a signaled intra-prediction mode and data from previously decoded blocks of the current frame or picture. When the video frame is coded as an inter-coded (i.e., B or P) slice, motion and disparity compensation unit 72 of prediction processing unit 71 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference picture lists (RefPicList0 and RefPicList1) using default construction techniques based on reference pictures stored in reference picture memory 82.

Motion and disparity compensation unit 72 determines prediction information for a video block of the current video slice by parsing the motion vectors and other syntax elements, and uses the prediction information to produce the predictive blocks for the current video block being decoded. For example, motion and disparity compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion and disparity compensation unit 72 may be configured to perform the ARP techniques described in this disclosure. As one example, for a bi-directionally predicted current block coded using ARP, motion and disparity compensation unit 72 may determine a first disparity motion vector for the current block and, using the first disparity motion vector, locate a first corresponding block of the current block in a second view. Motion and disparity compensation unit 72 may also determine a second disparity motion vector for the current block and, using the second disparity motion vector, locate a second corresponding block of the current block in a third view. From motion information of the first corresponding block and the second corresponding block, motion and disparity compensation unit 72 may determine a single motion vector. Motion and disparity compensation unit 72 may use this single motion vector to determine a reference block of the current block, a reference block of the first corresponding block, and a reference block of the second corresponding block. Motion and disparity compensation unit 72 may generate a first predictive block based on the first corresponding block, the reference block of the current block, and the reference block of the first corresponding block and generate a second predictive block based on the second corresponding block, the reference block of the current block, and the reference block of the second corresponding block.

Motion and disparity compensation unit 72 may further be configured to For example, motion and disparity compensation unit 72 may determine a current block of a first view is coded using an advanced residual prediction (ARP) mode and that the current block is bi-directionally predicted. For a luma block of the current block, motion and disparity compensation unit 72 may perform ARP for a first prediction direction to determine a first predictive block of the luma block and perform ARP for a second prediction direction to determine a second predictive block of the luma block. For a chroma block of the current block, motion and disparity compensation unit 72 may perform ARP for only one of the first prediction direction or the second prediction direction to determine a first predictive block of the chroma block.

Motion and disparity compensation unit 72 may further be configured to For example, motion and disparity compensation unit 72 may determine a current block of a first view is coded using an ARP mode. For a luma block of the current block, motion and disparity compensation unit 72 may perform ARP to determine a predictive block of the luma block. For a chroma block of the current block, motion and disparity compensation unit 72 may determine whether to perform ARP for the chroma block based on a size of the chroma block. As one example, motion and disparity compensation unit 72 may disable ARP in response to the size of the chroma block being 8×8. As another example, motion and disparity compensation unit 72 may disable ARP in response to the size of the chroma block being smaller than 32×32. As another example, motion and disparity compensation unit 72 may disable ARP in response to the size of the chroma block being equal to N×N and the current block comprising a sub-PU, wherein N equals one of 8, 16, 32, or 64. As another example, motion and disparity compensation unit 72 may perform ARP in response to the size of the chroma blocking being N×N and the current block comprising a PU. As another example, motion and disparity compensation unit 72 may disable ARP in response to the size of the chroma block being equal to N×N and the current block comprising a sub-PU and perform ARP in response to the size of the chroma blocking being M×M and the current block comprising a PU, wherein N and M equals one of 8, 16, 32, and 64, and wherein M is smaller than N.

Motion and disparity compensation unit 72 may also perform interpolation based on interpolation filters. Motion and disparity compensation unit 72 may use interpolation filters as used by video encoder 20 during encoding of the video blocks to calculate interpolated values for sub-integer pixels of reference blocks. In this case, motion and disparity compensation unit 72 may determine the interpolation filters used by video encoder 20 from the received syntax elements and use the interpolation filters to produce predictive blocks.

Inverse quantization processing unit 76 inverse quantizes (i.e., de-quantizes), the quantized transform coefficients provided in the bitstream and decoded by entropy decoding unit 70. The inverse quantization process may include use of a quantization parameter calculated by video encoder 20 for each video block in the video slice to determine a degree of quantization and, likewise, a degree of inverse quantization that should be applied. Inverse transform processing unit 78 applies an inverse transform (e.g., an inverse DCT, an inverse integer transform, or a conceptually similar inverse transform process), to the transform coefficients in order to produce residual blocks in the pixel domain.

After motion and disparity compensation unit 72 generates the predictive block for the current video block based on the motion vectors and other syntax elements, video decoder 30 forms a decoded video block by summing the residual blocks from inverse transform processing unit 78 with the corresponding predictive blocks generated by motion and disparity compensation unit 72. Summer 80 represents the component or components that perform this summation operation. If desired, a deblocking filter may also be applied to filter the decoded blocks in order to remove blocking artifacts. Other loop filters (either in the coding loop or after the coding loop) may also be used to smooth pixel transitions, or otherwise improve the video quality. The decoded video blocks in a given picture are then stored in reference picture memory 82, which stores reference pictures used for subsequent motion compensation. Reference picture memory 82 also stores decoded video for later presentation on a display device, such as display device 32 of FIG. 1.

In this manner, video decoder 30 is an example of a video decoder that may be configured to implement one or more example techniques described in this disclosure. For example, video data memory 69 stores video data. The video data may include information from which video decoder 30 can decode a texture video component of a dependent view and a depth view component that corresponds to the texture view component, each of which video encoder 20 is encoded in a 3D-AVC compliant or 3D-HEVC compliant video coding process.

In the techniques described in this disclosure, video decoder 30 may include one or more processors that are configured to decode, in a 3D-AVC compliant or 3D-HEVC compliant video coding process, a texture view component of a dependent view of the video data. To decode the texture view component, video decoder 30 may be configured to evaluate motion information of one or more neighboring blocks of a current block in the texture view component to determine whether at least one neighboring block is inter-view predicted with a disparity motion vector that refers to an inter-view reference picture in a view other than the dependent view. Video decoder 30 may derive a disparity vector for the current block based on the disparity motion vector for one of the neighboring blocks. For texture-first coding, video decoder 30 may decode a depth view component, of the video data, that corresponds to the texture view component subsequent to decoding the texture view component.

In some examples, prediction processing unit 71 of video decoder 30 may be one example of a processor configured to implement the examples described in this disclosure. In some examples, a unit (e.g., one or more processors) other than prediction processing unit 71 may implement the examples described above. In some examples, prediction processing unit 71 in conjunction with one or more other units of video decoder 30 may implement the examples described above. In yet some other examples, a processor of video decoder 30 (not shown in FIG. 16) may, alone or in conjunction with other processors of video decoder 30, implement the examples described above.

Figure 17:
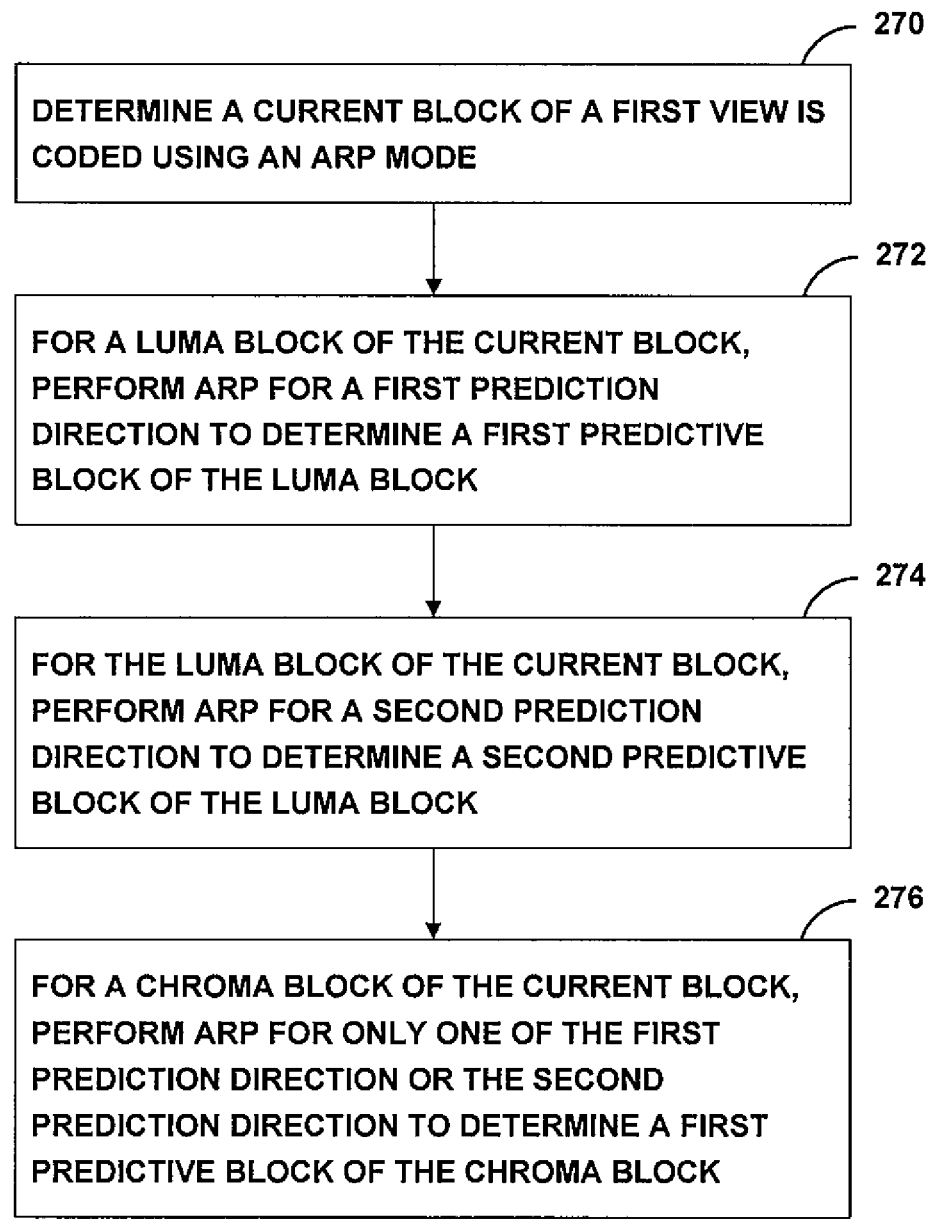
FIG. 17 shows an example method of predicting a video block according to the techniques of this disclosure.

FIG. 16 shows an example method of predicting a video block according to the techniques of this disclosure. The techniques of FIG. 16 may, for example, be performed by motion and disparity compensation unit 72 of video decoder 30 or by motion and disparity estimation unit 44 or motion and disparity compensation unit 46 of video encoder 20. According to the techniques of FIG. 16, a video coder may determine a current block of a first view is coded using an ARP mode and that the current block is bi-directionally predicted (250). The video coder may determine a first disparity motion vector and a second disparity motion vector for the current block (252). The video coder may locate, with the first disparity motion vector, a first corresponding block of the current block in a second view (254). The video coder may also locate, with the second disparity motion vector, a second corresponding block of the current block in a third view (256). The video coder may determine a motion vector from motion information of at least one of the first corresponding block of the current block and the second corresponding block of the current block (258). Using the motion vector, the video coder may identify a reference block of the current block in the first view, a reference block of the first corresponding block in the second view, and a reference block of the second corresponding block in the third view (260). In the example of FIG. 17, the second view and the third view may be either the same view or different views but will typically be different than the first view.

The video coder may generate a first predictive block based on the first corresponding block, the reference block of the current block, and the reference block of the first corresponding block (262). The video coder may generate a second predictive block based on the second corresponding block, the reference block of the current block, and the reference block of the second corresponding block (264). The video coder may, for example, generate the second predictive block by determining a residual predictor that corresponds to a difference between the reference block of the current block and the reference block of the second corresponding block. The video coder may add the residual predictor to the second corresponding block to generate the predictive block and may apply a weighting factor to the residual predictor before adding it to the second corresponding block.

The video coder may, for example, determine the motion vector from motion information of the at least one of the first corresponding block of the current block and the second corresponding block of the current block by, in response to a motion vector for the first corresponding block being unavailable, using a zero motion vector for the motion vector. In another example, the video coder may determine the motion vector from motion information of the at least one of the first corresponding block of the current block and the second corresponding block of the current block by, in response to a motion vector for the first corresponding block of the current block being unavailable, using a motion vector for the second corresponding block of the current block as the motion vector. In another example, the video coder may determine the motion vector from motion information of the at least one of the first corresponding block of the current block and the second corresponding block of the current block by, in response to a motion vector for the first corresponding block of the current block being unavailable and a motion vector for the second corresponding block of the current block being unavailable, using a zero motion vector for the motion vector.

Under some coding scenarios, the video coder may disable ARP. For example, a video in response to a motion vector for the first corresponding block of a second current block being unavailable, the video coder may disable ARP. In another example, in response to a motion vector for the first corresponding block of a second current block being unavailable and a motion vector for the second corresponding block of the second current block being unavailable, the video coder may disable ARP for the second current block.

FIG. 17 shows an example method of predicting a video block according to the techniques of this disclosure. The techniques of FIG. 17 may, for example, be performed by motion and disparity compensation unit 72 of video decoder 30 or by motion and disparity estimation unit 44 or motion and disparity compensation unit 46 of video encoder 20. According to the techniques of FIG. 17, a video coder may determine a current block of a first view is coded using an ARP mode and that the current block is bi-directionally predicted (270). For a luma block of the current block, the video coder may perform ARP for a first prediction direction to determine a first predictive block of the luma block (272). For the luma block of the current block, the video coder may perform ARP for a second prediction direction to determine a second predictive block of the luma block (274). For a chroma block of the current block, the video coder may perform ARP for only one of the first prediction direction or the second prediction direction to determine a first predictive block of the chroma block (276).

Figure 18:
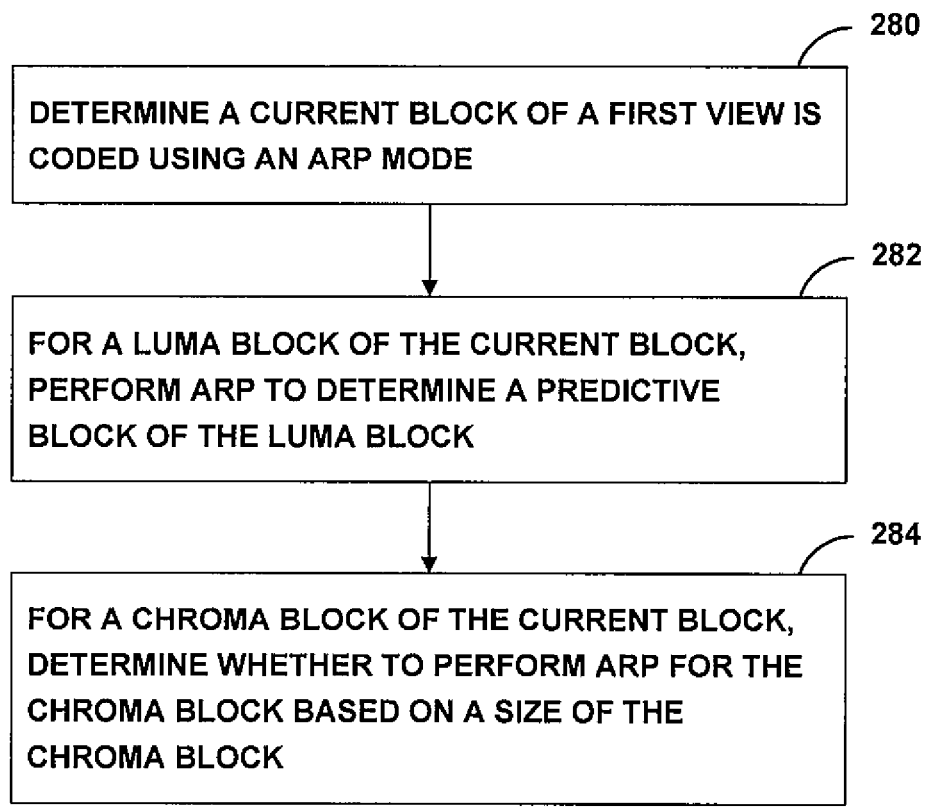
FIG. 18 shows an example method of predicting a video block according to the techniques of this disclosure.

FIG. 18 shows an example method of predicting a video block according to the techniques of this disclosure. The techniques of FIG. 18 may, for example, be performed by motion and disparity compensation unit 72 of video decoder 30 or by motion and disparity estimation unit 44 or motion and disparity compensation unit 46 of video encoder 20. According to the techniques of FIG. 18, the video coder may determine a current block of a first view is coded using an ARP mode (280). For a luma block of the current block, the video coder may perform ARP to determine a predictive block of the luma block (282). For a chroma block of the current block, the video coder may determine whether to perform ARP for the chroma block based on a size of the chroma block.

In one example, the video coder may determine whether to perform ARP for the chroma block based on the size of the chroma block by disabling ARP in response to the size of the chroma block being 8×8. In another example, the video coder may determine whether to perform ARP for the chroma block based on the size of the chroma block by disabling ARP in response to the size of the chroma block being smaller than 32×32. In another example, video coder may determine whether to perform ARP for the chroma block based on the size of the chroma block by disabling ARP in response to the size of the chroma block being equal to N×N and the current block comprising a sub-PU and perform ARP in response to the size of the chroma blocking being N×N and the current block comprising a PU. N may equal, for example, one of 8, 16, 32, or 64. In another example, the video coder may determine whether to perform ARP for the chroma block based on the size of the chroma block by disabling ARP in response to the size of the chroma block being equal to N×N and the current block comprising a sub-PU and performing ARP in response to the size of the chroma blocking being M×M and the current block comprising a PU. N and M may, for example, equal one of 8, 16, 32, and 64, M may be smaller than N.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
   determining a current block of a first view is coded using an advanced residual prediction (ARP) mode, wherein the current block is bi-directionally predicted;
   for a luma block of the current block, performing ARP for a first prediction direction to determine a first predictive block of the luma block;
   for the luma block of the current block, performing ARP for a second prediction direction to determine a second predictive block of the luma block;
   for a chroma block of the current block, performing ARP for only one of the first prediction direction or the second prediction direction to determine a first predictive block of the chroma block.

2. The method of claim 1, wherein coding comprises decoding, the method further comprising:
   based on the first predictive block of the luma block, the second predictive block of the luma block, and the first predictive block of the chroma block, determining a decoded version of the current block; and
   outputting a picture of video data that includes the decoded version of the current block.

3. The method of claim 1, wherein coding comprises encoding, the method further comprising:
   based on the first predictive block of the luma block, the second predictive block of the luma block, and the first predictive block of the chroma block, determining motion information for predicting the current block; and
   outputting encoded video data comprising the motion information.

4. A method of coding video data, the method comprising:
   determining a current block of a first view is coded using an advanced residual prediction (ARP) mode;
   for a luma block of the current block, performing ARP to determine a predictive block of the luma block;
   for a chroma block of the current block, determining whether to perform ARP for the chroma block based on a size of the chroma block.

5. The method of claim 4, wherein determining whether to perform ARP for the chroma block based on the size of the chroma block comprises disabling ARP in response to the size of the chroma block being 8×8.

6. The method of claim 4, wherein determining whether to perform ARP for the chroma block based on the size of the chroma block comprises disabling ARP in response to the size of the chroma block being smaller than 32×32.

7. The method of claim 4, wherein determining whether to perform ARP for the chroma block based on the size of the chroma block comprises:
   disabling ARP in response to the size of the chroma block being equal to N×N and the current block comprising a sub-PU, wherein N equals one of 8, 16, 32, or 64;
   performing ARP in response to the size of the chroma blocking being N×N and the current block comprising a PU.

8. The method of claim 4, wherein determining whether to perform ARP for the chroma block based on the size of the chroma block comprises:
   disabling ARP in response to the size of the chroma block being equal to N×N and the current block comprising a sub-PU, wherein N equals one of 8, 16, 32, or 64;
   performing ARP in response to the size of the chroma blocking being M×M and the current block comprising a PU, wherein M equals one of 8, 16, 32, and 64, and wherein M is smaller than N.

9. The method of claim 4, wherein coding comprises decoding, the method further comprising:
   based on the first predictive block of the luma block, the second predictive block of the luma block, and the first predictive block of the chroma block, determining a decoded version of the current block; and
   outputting a picture of video data that includes the decoded version of the current block.

10. The method of claim 4, wherein coding comprises encoding, the method further comprising:
    based on the first predictive block of the luma block, the second predictive block of the luma block, and the first predictive block of the chroma block, determining motion information for predicting the current block; and
    outputting encoded video data comprising the motion information.

11. A device for coding video data, the device comprising:
    a memory configured to store video data; and
    one or more processors configured to:
       determine a current block of a first view is coded using an advanced residual prediction (ARP) mode, wherein the current block is bi-directionally predicted;
       for a luma block of the current block, performing ARP for a first prediction direction to determine a first predictive block of the luma block;
       for the luma block of the current block, perform ARP for a second prediction direction to determine a second predictive block of the luma block; and
       for a chroma block of the current block, performing ARP for only one of the first prediction direction or the second prediction direction to determine a first predictive block of the chroma block.

12. The device of claim 11, wherein coding comprises decoding, and wherein the one or more processors are further configured to:
    based on the first predictive block of the luma block, the second predictive block of the luma block, and the first predictive block of the chroma block, determine a decoded version of the current block; and
    output a picture of video data that includes the decoded version of the current block.

13. The device of claim 11, wherein coding comprises encoding, and wherein the one or more processors are further configured to:
- based on the first predictive block of the luma block, the second predictive block of the luma block, and the first predictive block of the chroma block, determine motion information for predicting the current block; and
- output encoded video data comprising the motion information.

14. The device of claim 11, wherein the device comprises a wireless communication device, further comprising a receiver configured to receive encoded video data.

15. The device of claim 14, wherein the wireless communication device further comprises a demodulator configured to demodulate, according to a wireless communication standard, a signal comprising the encoded video data.

16. The device of claim 11, wherein the device comprises a wireless communication device, further comprising a transmitter configured to transmit encoded video data.

17. The device of claim 16, wherein the wireless communication device comprises a transmitter configured to modulate, according to a wireless communication standard, a signal comprising the encoded video data.

18. A device for coding video data, the device comprising:
- a memory configured to store video data; and
- one or more processors configured to:
  - determine a current block of a first view is coded using an advanced residual prediction (ARP) mode;
  - for a luma block of the current block, performing ARP to determine a predictive block of the luma block; and
  - for a chroma block of the current block, determining whether to perform ARP for the chroma block based on a size of the chroma block.

19. The device of claim 18, wherein coding comprises decoding, and wherein the one or more processors are further configured to:
- based on the first predictive block of the luma block, the second predictive block of the luma block, and the first predictive block of the chroma block, determine a decoded version of the current block; and
- output a picture of video data that includes the decoded version of the current block.

20. The device of claim 18, wherein coding comprises encoding, and wherein the one or more processors are further configured to:
- based on the first predictive block of the luma block, the second predictive block of the luma block, and the first predictive block of the chroma block, determine motion information for predicting the current block; and
- output encoded video data comprising the motion information.

21. The device of claim 18, wherein the device comprises a wireless communication device, further comprising a receiver configured to receive encoded video data.

22. The device of claim 21, wherein the wireless communication device further comprises a demodulator configured to demodulate, according to a wireless communication standard, a signal comprising the encoded video data.

23. The device of claim 18, wherein the device comprises a wireless communication device, further comprising a transmitter configured to transmit encoded video data.

24. The device of claim 23, wherein the wireless communication device comprises a transmitter configured to modulate, according to a wireless communication standard, a signal comprising the encoded video data.

* * * * *